United States Patent
Ho et al.

(10) Patent No.: US 9,043,536 B2
(45) Date of Patent: May 26, 2015

(54) METHOD OF RECORDING MAPPING INFORMATION, AND MEMORY CONTROLLER AND MEMORY STORAGE APPARATUS USING THE SAME

(71) Applicant: PHISON ELCTRONICS CORP., Miaoli (TW)

(72) Inventors: Kuo-Hwa Ho, Miaoli (TW); Kheng-Chong Tan, Miaoli (TW)

(73) Assignee: PHISON ELECTRONICS CORP., Miaoli (TW)

( * ) Notice: Subject to any disclaimer, the term of this patent is extended or adjusted under 35 U.S.C. 154(b) by 229 days.

(21) Appl. No.: 13/896,328

(22) Filed: May 17, 2013

(65) Prior Publication Data

US 2014/0289451 A1    Sep. 25, 2014

(30) Foreign Application Priority Data

Mar. 20, 2013   (TW) .............................. 102109836 A

(51) Int. Cl.
  *G06F 12/10*   (2006.01)
  *G06F 12/02*   (2006.01)
(52) U.S. Cl.
  CPC .... *G06F 12/0246* (2013.01); *G06F 2212/7201* (2013.01)
(58) Field of Classification Search
  CPC .................... G06F 12/0246; G06F 2212/7201; G06F 13/24
  See application file for complete search history.

(56) References Cited

U.S. PATENT DOCUMENTS

| | | | | |
|---|---|---|---|---|
| 2002/0124133 A1* | 9/2002 | Duruoz | .......................... | 711/112 |
| 2006/0184722 A1* | 8/2006 | Sinclair | .......................... | 711/103 |
| 2008/0209420 A1* | 8/2008 | Matsuo | .......................... | 718/100 |
| 2010/0161936 A1* | 6/2010 | Royer et al. | .................. | 711/209 |
| 2012/0079167 A1* | 3/2012 | Yao et al. | ...................... | 711/103 |
| 2014/0208062 A1* | 7/2014 | Cohen | .......................... | 711/206 |

FOREIGN PATENT DOCUMENTS

| | | |
|---|---|---|
| TW | 201118569 | 6/2011 |
| TW | 201305818 | 2/2013 |

* cited by examiner

*Primary Examiner* — John Lane
(74) *Attorney, Agent, or Firm* — Jianq Chyun IP Office

(57) ABSTRACT

A method of recording mapping information for a rewritable non-volatile memory module is provided. The method includes configuring a plurality of logical addresses, establishing at least one logical address mapping table, and storing the at least one logical address mapping table into the rewritable non-volatile memory module. The method also includes receiving data to be stored into a plurality of continuous logical addresses from a host system, writing the data into a plurality of physical programming units, updating mapping relations between the continuous logical addresses and the physical programming units in a corresponding logical address mapping table loaded to a buffer memory, storing a continuous mapping table in the buffer memory, and recording a continuous mapping record corresponding to the continuous logical addresses in the continuous mapping table.

24 Claims, 18 Drawing Sheets

| Logical address index | Physical address |
|---|---|
| LBA(0) | NULL |
| LBA(1) | NULL |
| LBA(2) | NULL |
| ⋮ | ⋮ |
| LBA(Z) | NULL |

FIG. 8

| Logical address index | Physical address |
|---|---|
| LBA(0) | NULL |
| LBA(1) | PBA(0-1) |
| LBA(2) | NULL |
| ⋮ | ⋮ |
| LBA(Z) | NULL |

FIG. 9

| Logical address index | Physical address |
|---|---|
| LBA(0) | NULL |
| LBA(1) | PBA(0-1) |
| LBA(2) | NULL |
| ⋮ | ⋮ |
| LBA(128) | NULL |
| LBA(129) | PBA(0-2) |
| LBA(130) | NULL |
| ⋮ | ⋮ |
| LBA(Z) | NULL |

FIG. 10

| Logical address index | Physical address |
|---|---|
| LBA(0) | NULL |
| LBA(1) | PBA(0-3) |
| LBA(2) | NULL |
| ⋮ | ⋮ |
| LBA(128) | NULL |
| LBA(129) | PBA(0-2) |
| LBA(130) | NULL |
| ⋮ | ⋮ |
| LBA(Z) | NULL |

FIG. 11

|                      | 1292 | 1294 |
|---|---|---|
|  | Logical address index | Status |
|  | PBA(0-1) | 0 |
|  | PBA(0-2) | 1 |
|  | PBA(0-3) | 1 |
|  | PBA(0-4) | 0 |
|  | ⋮ | ⋮ |
|  | PBA(N-K) | 0 |

| 1302 | 1304 | 1306 | 1308 |
|---|---|---|---|
| Record reference number field | Start logical address field | Start physical programming unit field | Length |
|  |  |  |  |
|  |  |  |  |
|  |  |  |  |
| ⋮ | ⋮ | ⋮ | ⋮ |
|  |  |  |  |

METHOD OF RECORDING MAPPING INFORMATION, AND MEMORY CONTROLLER AND MEMORY STORAGE APPARATUS USING THE SAME

CROSS-REFERENCE TO RELATED APPLICATION

This application claims the priority benefit of Taiwan application serial no. 102109836, filed on Mar. 20, 2013. The entirety of the above-mentioned patent application is hereby incorporated by reference herein and made a part of this specification.

BACKGROUND

1. Technology Field

The present invention relates to a method of recording mapping information for a rewritable non-volatile memory, a memory controller using the same, and a memory storage apparatus using the same.

2. Description of Related Art

Digital cameras, mobile phones, and MP3 players have undergone rapid growth in recent years, so that consumers' demands for storage media have also increased drastically. Since a rewritable non-volatile memory has the characteristics of data non-volatility, low power consumption, small volume, non-mechanical structure, and fast reading and writing speed, the rewritable non-volatile memory is one of the most adaptable memories to be applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

In general, a flash memory module of a flash memory storage apparatus is divided into a plurality of physical blocks, and each physical block is further divided into a plurality of physical pages. In the flash memory, each physical block is an erasing unit, and each physical page is a writing unit. When the memory cells of the flash memory are programmed, the programming may only be performed in a one-way manner (i.e., the value of each memory cell is programmed from '1' to '0'); therefore, a direct data-writing operation cannot be performed on the programmed physical page (i.e., the physical page where old data are stored) until the physical page is erased for re-programming. In particular, the physical block is used as a unit for erasing data in the flash memory, and thus when an erasing operation is performed on a physical page where old data are stored, the entire physical block which contains the physical pages must be erased. Accordingly, the physical blocks of the flash memory module are grouped into a data area and a spare area. The physical blocks in the data area are physical blocks which have been used for storing data, while the physical blocks in the spare area are physical blocks which have not been used for storing data. When a host system is about to store data in the flash memory storage apparatus, a control circuit of the flash memory storage apparatus selects a physical block from the spare area to write data and associates the selected physical block with the data area. In addition, after the physical blocks in the data area are erased, the erased physical blocks are associated with the spare area.

In the host system, the writing operation is performed through logical addresses; therefore, during the operation of the flash memory storage apparatus, the control circuit serves to store mapping relations between the logical addresses and the physical pages in a random access memory (RAM) that is configured to temporarily store data, so as to access the data in an effortless manner. However, the RAM in the flash memory storage system has limited storage capacity; and thus how to effectively record the mapping relations between the logical addresses and the physical pages for accelerating the speed of data access has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a method of recording mapping information, a memory controller, and a memory storage apparatus capable of effectively recording mapping relations between logical addresses and physical addresses and accelerating the speed of reading data.

In an exemplary embodiment of the present invention, a method of recording mapping information for a rewritable non-volatile memory module is provided. The rewritable non-volatile memory module includes a plurality of physical erasing units, and each of the physical erasing units includes a plurality of physical programming units. The method includes configuring a plurality of logical addresses, establishing at least one logical address mapping table and storing the at least one logical address mapping table into the rewritable non-volatile memory module. The method also includes receiving a plurality of first data from a host system, wherein the host system requests to store the first data into a plurality of first continuous logical addresses among the logical addresses. The method further includes writing the first data into a plurality of first physical programming units among the physical programming units of the physical erasing units, loading a first logical address mapping table corresponding to the first continuous logical addresses to a buffer memory, updating mapping relations between the first continuous logical addresses and the first physical programming units in the first logical address mapping table, storing a continuous mapping table in the buffer memory, and recording a first continuous mapping record corresponding to the first continuous logical addresses in the continuous mapping table.

In an exemplary embodiment of the present invention, a memory controller configured in a memory storage apparatus is provided. The memory controller includes a host interface, a memory interface, a buffer memory, and a memory management circuit. The host interface is configured for being coupled to a host system. The memory interface is configured for being coupled to the rewritable non-volatile memory module. The memory management circuit is coupled to the host interface, the memory interface, and the buffer memory. The memory management circuit is configured to configure a plurality of logical addresses, establish at least one logical address mapping table, and store the at least one logical address mapping table into the rewritable non-volatile memory module. The memory management circuit is also configured to receive a plurality of first data from the host system, wherein the host system requests to store the first data into a plurality of first continuous logical addresses among the logical addresses. The memory management circuit is further configured to write the first data into a plurality of first physical programming units among the physical programming units of the physical erasing units, load a first logical address mapping table corresponding to the first continuous logical addresses to the buffer memory and update mapping relations between the first continuous logical addresses and the first physical programming units in the first logical address mapping table, store a continuous mapping table in the buffer memory, and record a first continuous mapping record corresponding to the first continuous logical addresses in the continuous mapping table.

In an exemplary embodiment of the present invention, a memory storage apparatus that includes a connector, a rewritable non-volatile memory module, and a memory controller is provided. The connector is configured for being coupled to the host system, and the memory controller is coupled to the rewritable non-volatile memory module and the connector. The memory controller is configured to configure a plurality of logical addresses, establish at least one logical address mapping table, and store the at least one logical address mapping table into the rewritable non-volatile memory module. The memory controller is also configured to receive a plurality of first data from the host system, wherein the host system requests to store the first data into a plurality of first continuous logical addresses among the logical addresses. The memory controller is further configured to write the first data into a plurality of first physical programming units among the physical programming units of the physical erasing units, load a first logical address mapping table corresponding to the first continuous logical addresses to the buffer memory and update mapping relations between the first continuous logical addresses and the first physical programming units in the first logical address mapping table, store a continuous mapping table in the buffer memory, and record a first continuous mapping record corresponding to the first continuous logical addresses in the continuous mapping table.

In light of the foregoing, by applying the method of recording the mapping information, the memory controller, and the memory storage apparatus described herein, the continuous mapping information may be recorded in the buffer memory with limited storage capacity, and thereby the data-reading speed may be accelerated.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIG. 8 illustrates an example of a logical address mapping table according to an exemplary embodiment of the present invention.

FIG. 9 to FIG. 11 illustrate an example of performing a writing operation for updating a logical address mapping table according to an exemplary embodiment of the present invention.

FIG. 12 is a schematic diagram illustrating a physical address storage status table according to an exemplary embodiment of the present invention.

FIG. 13 is a schematic diagram illustrating an example of a continuous mapping table according to an exemplary embodiment of the present invention.

DESCRIPTION OF EMBODIMENTS

Figure 1:
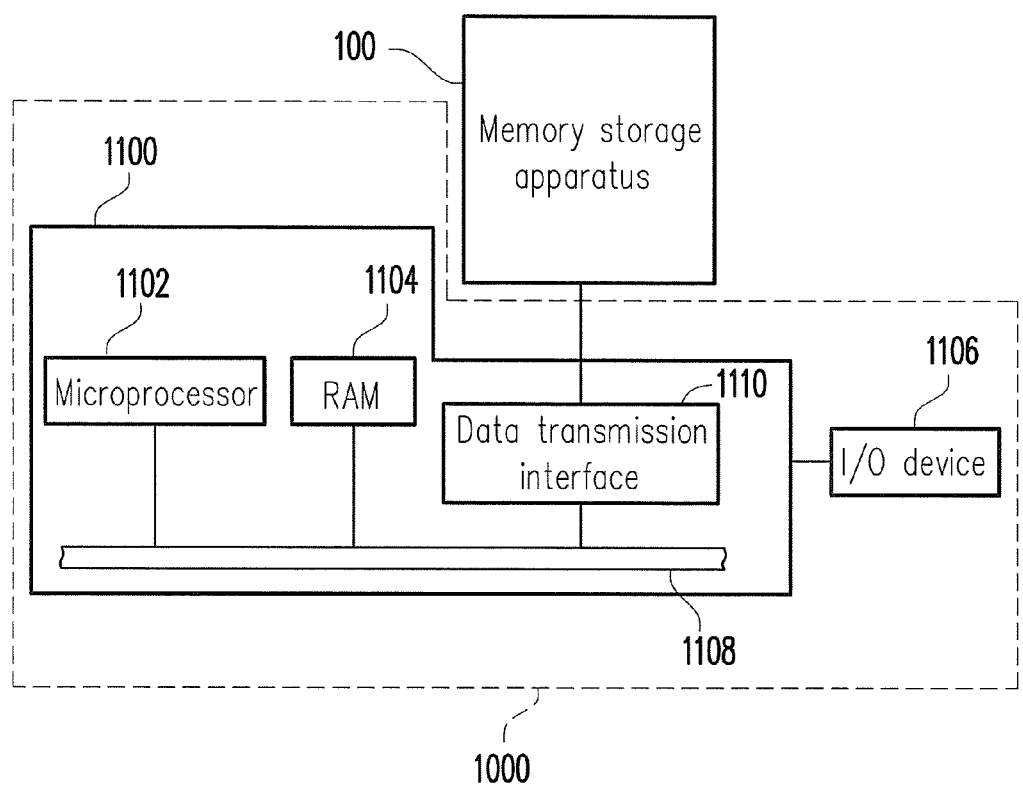
FIG. 1 illustrates a host system and a memory storage apparatus according to an exemplary embodiment of the present invention.

Reference will now be made in detail to the present exemplary embodiments of the present invention, examples of which are illustrated in the accompanying drawings. Wherever possible, the same reference numbers are used in the drawings and the description to refer to the same or like parts. Embodiments of the present invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. It is to be noted that the term "a" or "an" entity refers to one or more of that entity. As such, the terms "a" (or "an"), "one or more," and "at least one" can be used interchangeably herein.

A memory storage apparatus (also referred to as a memory storage system) typically includes a rewritable non-volatile memory module and a controller (also referred to as a control circuit). The memory storage apparatus is usually used together with a host system, such that the host system is able to write data into or read data from the memory storage apparatus.

FIG. 1 illustrates a host system and a memory storage apparatus according to an exemplary embodiment of the present invention.

Figure 2:
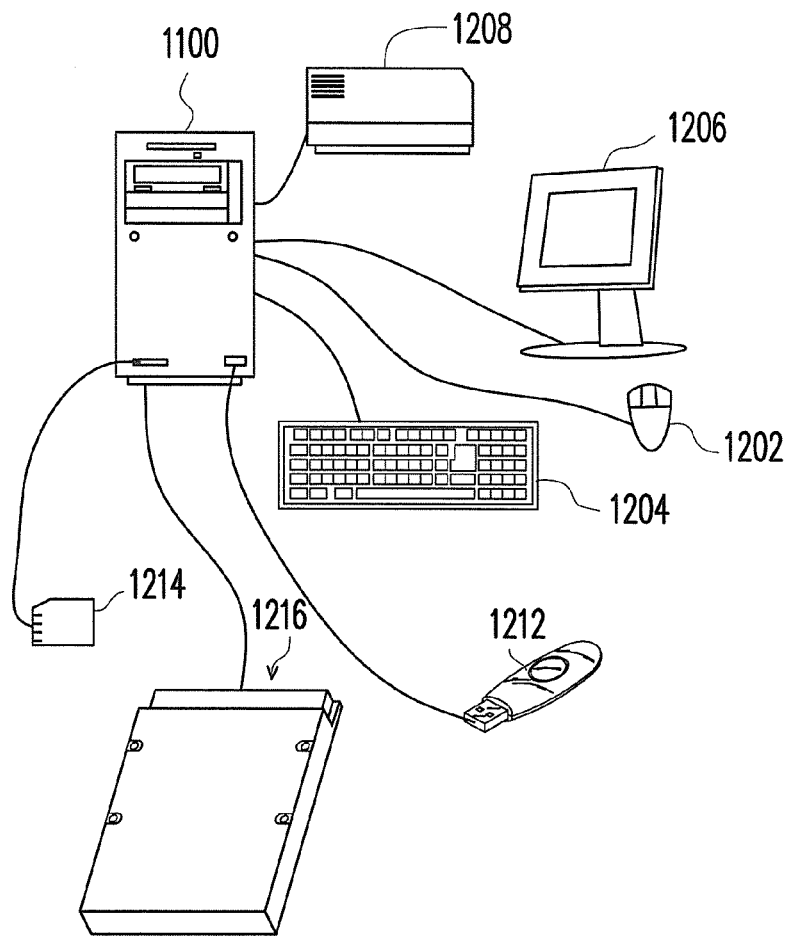
FIG. 2 is a schematic diagram illustrating a computer, an input/output (I/O) device, and a memory storage apparatus according to an exemplary embodiment of the present invention.

With reference to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208 as shown in FIG. 2. It should be understood that the I/O device 1106 is not limited to include the devices shown in FIG. 2 and may further include other devices.

In the exemplary embodiment of the present invention, the memory storage apparatus 100 is coupled to other devices of the host system 1000 through the data transmission interface 1110. Through operating the microprocessor 1102, the RAM 1104, and the I/O device 1106, the data can be written into or read from the memory storage apparatus 100. For instance, the memory storage apparatus 100 may be a rewritable non-volatile memory storage apparatus, such as a flash drive 1212, a memory card 1214, or a solid state drive (SSD) 1216 shown in FIG. 2.

Figure 3:
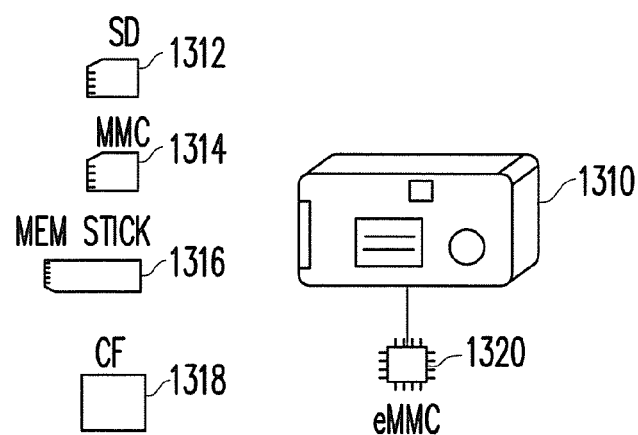
FIG. 3 is a schematic diagram illustrating a host system and a memory storage apparatus according to an exemplary embodiment of the present invention.

Generally, the host system 1000 can substantially be any system operated together with the memory storage apparatus 100 for storing data. In the exemplary embodiment, although the host system 1000 is described as a computer system, the host system 1000 in another exemplary embodiment of the present invention may be a digital camera, a video camera, a communication device, an audio player, a video player, and so forth. For instance, if the host system is a digital camera (video camera) 1310, the rewritable non-volatile memory storage apparatus is then an SD card 1312, an MMC card 1314, a memory stick 1316, a CF card 1318, or an embedded storage apparatus 1320 (as shown in FIG. 3). The embedded storage apparatus 1320 includes an embedded MMC (eMMC). It should be mentioned that the eMMC is directly coupled to the motherboard of the host system.

Figure 4:
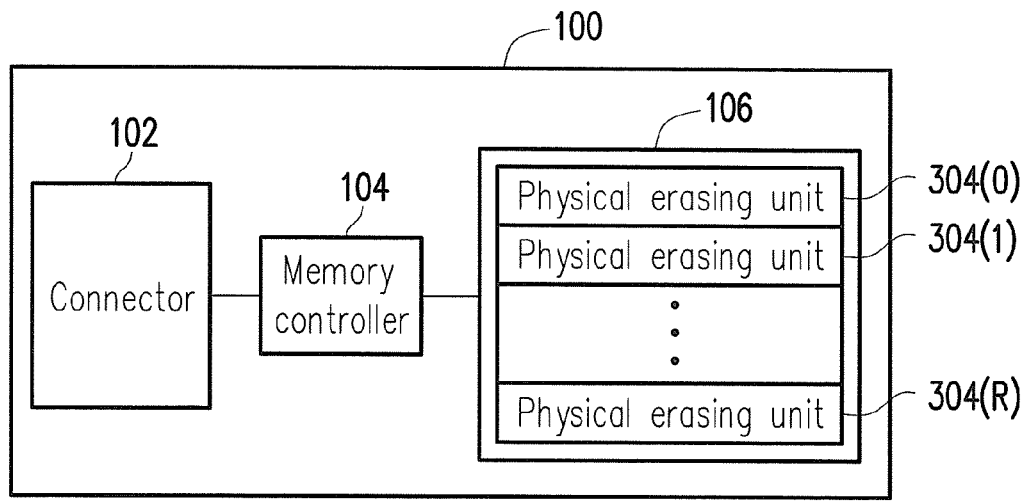
FIG. 4 is a simple block diagram illustrating the memory storage apparatus depicted in FIG. 1.

FIG. 4 is a simple block diagram illustrating the memory storage apparatus depicted in FIG. 1.

With reference to FIG. 4, the memory storage apparatus 100 includes a connector 102, a memory controller 104, and a rewritable non-volatile memory module 106.

In the present exemplary embodiment, the connector 102 complies with a secure digital (SD) interface standard. However, it should be understood that the present invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the serial advanced technology attachment (SATA) standard, the ultra high speed-I (UHS-I) interface standard, the ultra high speed-II (UHS-II) interface standard, the memory stick (MS) interface standard, the multi media card (MMC) interface standard, the eMMC interface standard, the universal flash storage (UFS) interface standard, the compact flash (CF) standard, the integrated device electronics (IDE) standard, or other suitable standards.

The memory controller 104 is configured to execute a plurality of logic gates or control commands implemented in a hardware form or a firmware form and perform various data operations (e.g., data writing, reading, and erasing) in the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has a plurality of physical erasing units 304(0) to 304(R). For instance, the physical erasing units 304(0) to 304(R) may belong to the same memory die or belong to different memory dies. Each physical erasing unit has a plurality of physical programming units, and the physical programming units of the same physical erasing unit may be written independently and erased simultaneously. For instance, each physical erasing unit is composed of 128 physical programming units. However, the present invention is not limited thereto, and each of the erasing units may also be comprised of 64, 256, or any other number of physical programming units.

More specifically, the physical erasing unit is the smallest unit for erasing data; namely, each of the physical erasing units contains the least number of memory cells that are erased all together. The physical programming unit is the smallest unit for programming data; that is, each of the physical programming units is the smallest unit for writing data. Each physical programming unit usually includes a data bit area and a redundant bit area. The data bit area includes a plurality of physical access addresses for storing data of users, and the redundant bit area is configured for storing system data (e.g., control information and error correcting codes). In the present exemplary embodiment, each data bit area of the physical programming unit contains 4 physical access addresses, and the size of each physical access address is 512 bytes. However, in other exemplary embodiments, more or less number of the physical access addresses may be contained in the data bit area, and the amount and the size of the physical access addresses are not limited in the present invention. For instance, in an exemplary embodiment, the physical erasing units are physical blocks, and the physical programming units are physical pages or a physical sectors, which should however not be construed as limitations to the present invention.

In the present exemplary embodiment, the rewritable non-volatile memory module 106 is a multi-level cell (MLC) NAND flash memory module (i.e., a flash memory module capable of storing data of 2 bits in one memory cell). However, the present invention is not limited thereto, and the rewritable non-volatile memory module 106 may also be a single-level cell (SLC) NAND flash memory module (i.e., a flash memory module capable of storing data of 1 bit in one memory cell), a trinary-level cell (TLC) NAND flash memory module (i.e., a flash memory module capable of storing data of 3 bits in one memory cell), other flash memory modules, or other memory modules having the same characteristics.

Figure 5:
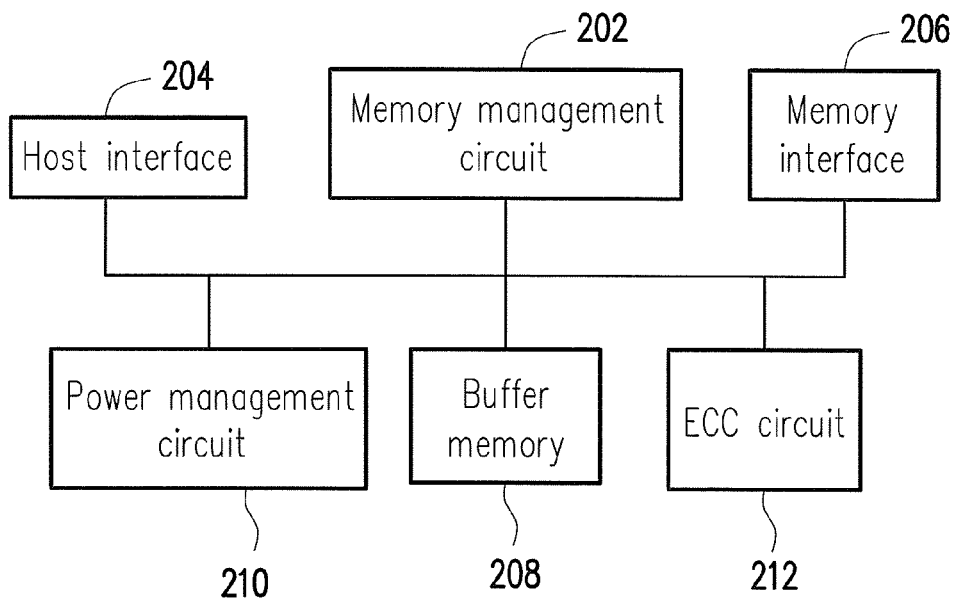
FIG. 5 is a schematic block diagram illustrating a memory controller according to an exemplary embodiment of the present invention.

FIG. 5 is a schematic block diagram illustrating a memory controller according to an exemplary embodiment of the present invention. It should be understood that the structure of the memory controller depicted in FIG. 5 is merely exemplary and should not be construed as a limitation to the present invention.

With reference to FIG. 5, the memory controller 104 includes a memory management circuit 202, a host interface 204, a memory interface 206, and a buffer memory 208.

The memory management circuit 202 is configured to control the overall operation of the memory controller 104. Particularly, the memory management circuit 202 has a plurality of control commands; when the memory storage apparatus 100 is in operation, the control commands are executed to perform data writing, reading, and erasing operations.

In the present exemplary embodiment, the control commands of the memory management circuit 202 are implemented in a firmware form. For instance, the memory management circuit 202 has a microprocessor unit (not shown) and a read-only memory (ROM, not shown), and the control commands are burnt into the ROM. When the memory storage apparatus 100 is in operation, the control commands are executed by the microprocessor unit to write, read, and erase data.

In another exemplary embodiment of the present invention, the control commands of the memory management circuit 202 are stored in a specific area (for instance, the system area of the memory module exclusively used for storing system data) of the rewritable non-volatile memory module 106 as program codes. Additionally, the memory management circuit 202 may have a micro-processor unit (not shown), a ROM (not shown), and a RAM (not shown). In particular, the ROM has boot codes, and when the memory controller 104 is enabled, the microprocessor unit first executes the boot codes to load the control commands from the rewritable non-volatile memory module 106 into the RAM of the memory management circuit 202. The microprocessor unit then runs the control commands to write, read, and erase data.

Moreover, the control commands of the memory management circuit 202 may also be implemented in a hardware form according to another exemplary embodiment of the present invention. For instance, the memory management circuit 202 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage physical erasing units of the rewritable non-volatile memory module 106. The memory writing circuit is configured to issue a writing command to the rewritable non-volatile memory module 106 for writing data thereto. The memory reading circuit is configured to issue a reading command to the rewritable non-volatile memory module 106 for reading data therefrom. The memory erasing circuit is configured to issue an erasing command to the rewritable non-volatile memory module 106 for erasing data therefrom. The data processing circuit is configured to process data to be written to the rewritable non-volatile memory module 106 or data read from the rewritable non-volatile memory module 106.

The host interface 204 is coupled to the memory management circuit 202 and configured to receive and identify commands and data transmitted by the host system 1000. Namely, the commands and data from the host system 1000 are transmitted to the memory management circuit 202 through the host interface 204. In the present exemplary embodiment, the host interface unit 204 complies with the SD standard. However, it should be understood that the invention is not limited thereto, and the host interface 204 may comply with the PATA standard, the IEEE 1394 standard, the PCI express standard, the USB standard, the SATA standard, the UHS-I interface standard, the UHS-II interface standard, the MS standard, the MMC standard, the eMMC interface standard, the UFS interface standard, the CF standard, the IDE standard, or other suitable data transmission standards.

The memory interface 206 is coupled to the memory management circuit 202 and configured to access the rewritable non-volatile memory module 106. Namely, data to be written into the rewritable non-volatile memory module 106 may be converted by the memory interface 206 into a format acceptable to the rewritable non-volatile memory module 106.

The buffer memory 208 is coupled to the memory management circuit 202 and configured to temporarily store data and commands received from the host system 1000 or data received from the rewritable non-volatile memory module 106.

In an exemplary embodiment of the invention, the memory controller 104 further includes a power management circuit 210 and an error checking and correcting (ECC) circuit 212.

The power management circuit 210 is coupled to the memory management circuit 202 and configured to control the power supply of the memory storage apparatus 100.

The ECC circuit 212 is coupled to the memory management circuit 202 and configured to perform an ECC procedure to ensure data accuracy. To be specific, when the memory management circuit 202 receives a writing command from the host system 1000, the ECC circuit 212 generates an ECC code for data corresponding to the writing command, and the memory management circuit 202 writes the data and the corresponding ECC code into the rewritable non-volatile memory module 106. Thereafter, when reading the data from the rewritable non-volatile memory module 106, the memory management circuit 202 simultaneously reads the ECC code corresponding to the data, and the ECC circuit 212 performs the ECC procedure on the read data according to the corresponding ECC code.

Figure 6:
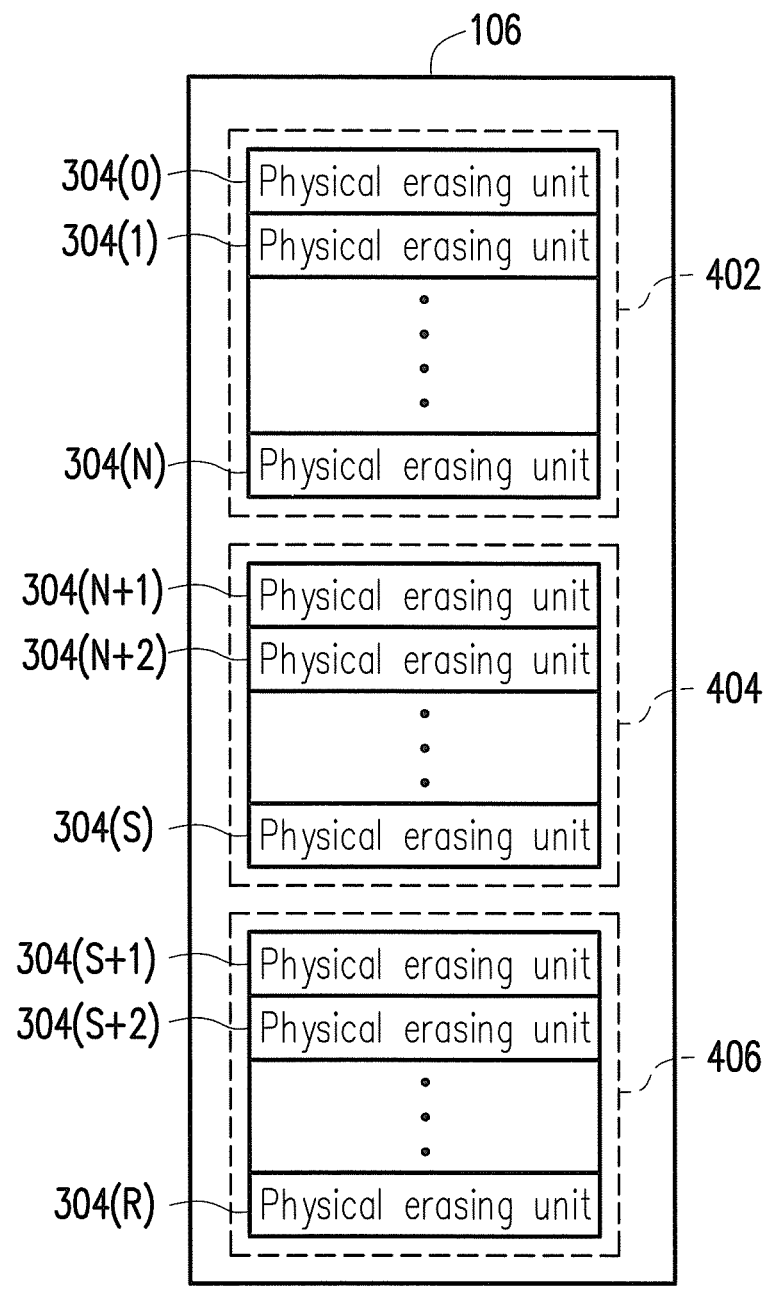
FIG. 6 and FIG. 7 schematically illustrate an example of managing a rewritable non-volatile memory module according to an exemplary embodiment of the present invention.
Figure 7:
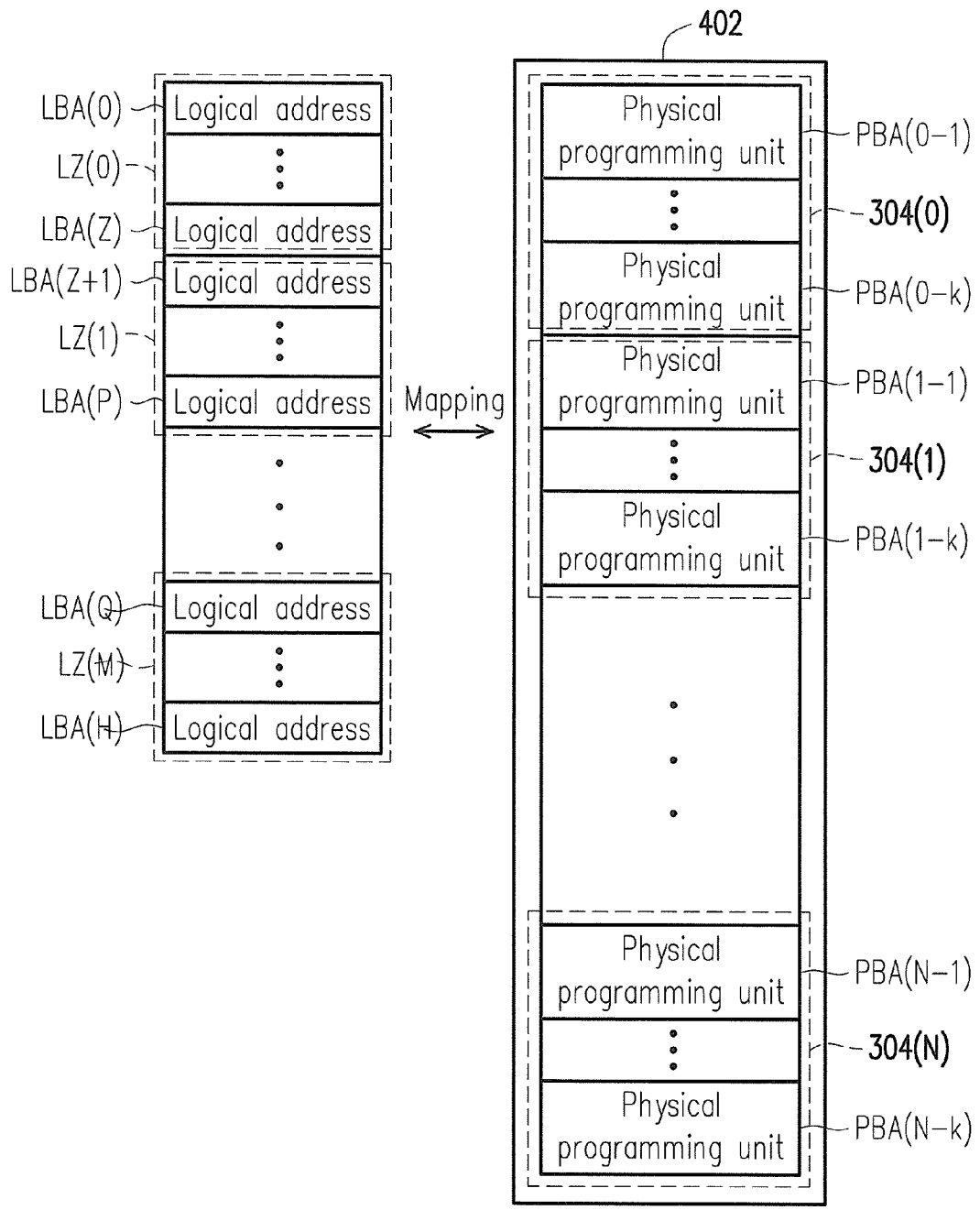

FIG. 6 and FIG. 7 schematically illustrate an example of managing a rewritable non-volatile memory module according to an exemplary embodiment of the present invention.

It should be understood that the terms used herein for describing the operations (such as "select", "exchange", "group", and "alternate") performed on the physical erasing units of the rewritable non-volatile memory module 106 refer to logical operations performed on these physical erasing units. Namely, the physical erasing units in the rewritable non-volatile memory module are only logically operated, and the actual positions of the physical erasing units in the rewritable non-volatile memory module are not changed.

With reference to FIG. 6, the memory controller 104 (or the memory management circuit 102) logically groups the physical erasing units 304(0) to 304(R) of the rewritable non-volatile memory module 106 into a storage area 402, a system area 404, and a replacement area 408.

The physical erasing units 304(0) to 304(N) logically belonging to the storage area 304 are used for storing data written by the host system 1000. Namely, the memory storage apparatus 100 uses the physical erasing units in the storage area 402 for actually storing data written by the host system 1000.

The physical erasing units 304(N+1) to 304(S) logically belonging to the system area 404 are used for recording system data; here, the system data include information related to a manufacturer and a model of a memory chip, the number of the physical erasing units in the memory chip, the number of physical programming units in each memory chip, and so forth.

The physical erasing units 304(S+1) to 304(R) logically belonging to the replacement area 406 are replacement physical erasing units. For instance, after the rewritable non-volatile memory module 106 is manufactured in the factory, 4% of the physical erasing units are reserved for replacement. That is to say, when any physical erasing unit belonging to the storage area 402 and the system area 404 is damaged, the physical erasing unit reserved in the replacement area 406 serves to replace the damaged physical erasing unit (i.e. a bad unit). Thus, if there are still available physical erasing units in the replacement area 406, and a physical erasing unit is damaged, the memory controller 104 selects one of the normal physical erasing units from the replacement area 406 to replace the damaged physical erasing unit. If there is no available physical erasing unit in the replacement area 406, and a physical erasing unit is damaged, the memory controller 104 announces that the entire memory storage device 100 is in a write-protect mode, and thus no more data can be written into the memory storage device 100.

In particular, the number of physical erasing units in the storage area 402, the system area 404, and the replacement area 406 may be different according to the different memory specifications used. Additionally, it has to be understood that the grouping relations of the physical erasing units associated with the storage area 402, the system area 404, and the replacement area 406 may be dynamically changed during the operation of the memory storage apparatus 100. For instance, when a physical erasing unit in the storage area 402 is damaged and replaced by a physical erasing unit in the replacement area 406, the physical erasing unit originally belonging to the replacement area 406 is then associated with the storage area 402.

With reference to FIG. 7, as described above, the physical erasing units in the storage area 402 are alternated to store data written by the host system 1000. In the present exemplary embodiment, the memory controller 104 (or the memory management circuit 202) assigns logical addresses LBA(0) to LBA(H) to the host system 1000 for data access. Each logical address is composed of several sectors. In the present exemplary embodiment, each logical address is composed of four sectors. However, the invention is not limited thereto, and in another exemplary embodiment of the present invention, each of the logical addresses may be composed of eight or sixteen sectors. Generally, the number of the physical programming units of the physical erasing units in the storage area 402 is greater than the number of the logical addresses thereto.

For instance, when the memory controller 104 (or the memory management circuit 202) stores data to be written by the host system 1000 through using the physical erasing unit 304(0), regardless of which logical address is selected by the host system 1000 for writing data, the memory controller 104 (or the memory management circuit 202) writes data into the physical programming units of the physical erasing unit 304(0); when the memory controller 104 (or the memory management circuit 202) stores data written by the host system 1000 through using the physical erasing unit 304(1), regardless of which logical address is selected by the host system 1000 for writing data, the memory controller 104 (or the memory management circuit 202) writes data into the physical programming units of the physical erasing unit 304(1).

In order to identify where each logical address of data is stored in the physical programming unit, in the present exemplary embodiment, the memory controller 104 (or the memory management circuit 202) records mapping relations between the logical addresses and the physical programming units. When the host system 1000 accesses data in the sector, the memory controller 104 (or the memory management circuit 202) confirms the logical address where such sector belongs and accesses data from the physical programming unit mapped to such logical address. For instance, in the present exemplary embodiment, the memory controller 104 (or the memory management circuit 202) stores a logical address mapping table in the rewritable non-volatile memory module 106 for recording each physical programming unit mapped to the logical address. When accessing data, the memory controller 104 (or the memory management circuit 202) loads the logical address mapping table to the buffer memory 208 for updating.

It should be mentioned that the buffer memory 208 may not be able to store the mapping tables recording the mapping relations of all logical addresses due to its limited capacity. Therefore, in the present exemplary embodiment, the memory controller 104 (or the memory management circuit 202) groups the logical addresses LBA(0) to LBA(H) into a plurality of logical zones LZ(0) to LZ(M) and assigns one logical address mapping table to each logical zone. Particularly, when the memory controller 104 (or the memory management circuit 202) updates the mapping relation of certain logical address, the logical address mapping table corresponding to the logical zone of the logical address is loaded to the buffer memory 208 and is then updated.

FIG. 8 illustrates an example of a logical address mapping table according to an exemplary embodiment of the present invention.

With reference to FIG. 8, in the present exemplary embodiment, the logical address mapping table of each logical zone is identical, and a logical address mapping table 800 corresponding to a logical zone LZ(0) is exemplified hereinafter to elaborate the present invention. The logical address mapping table 800 includes a logical address index field 802 and a physical address field 804. The logical address index field 802 records the reference number of each logical address, and the physical address field 804 records the physical programming unit mapped to each logical address. In the event that the memory storage apparatus 100 is brand new and has never been used for storing data, each field corresponding to the physical programming unit mapped to each logical address in all of the logical address mapping tables is marked as void value (e.g. NULL).

FIG. 9 to FIG. 11 illustrate an example of performing a writing operation for updating a logical address mapping table according to an exemplary embodiment of the present invention.

With reference to FIG. 9, given that the host system 1000 is about to write data into a logical address LBA(1) on the condition that the memory storage apparatus 100 is brand new and has never been used for storing data, the memory controller 104 (or the memory management circuit 202) selects a physical erasing unit (e.g., the physical erasing unit 304(0)) and writes the data to be written by the host system 1000 into a physical programming unit PBA(0-1). After the data-writing operation is completed, the memory controller 104 (or the memory management unit 202) maps the logical address LBA(1) to the physical program unit PBA(0-1) in the logical address mapping table 800.

With reference to FIG. 10, given that the host system 1000 is about to write data into a logical address LBA(129) under the circumstances shown in FIG. 9, the memory controller 104 (or the memory management circuit 202) writes the data to be written by the host system 1000 into a physical programming unit PBA(0-2). In this case, the memory controller 104 (or the memory management unit 202) maps the logical address LBA(129) to the physical programming unit PBA(0-2) in the logical address mapping table 800.

With reference to FIG. 11, given that the host system 1000 is about to write data into a logical address LBA(1) under the circumstances shown in FIG. 10, the memory controller 104 (or the memory management circuit 202) writes the data to be written by the host system 1000 into a physical programming unit PBA(0-3). In this case, the memory controller 104 (or the memory management unit 202) maps the logical address LBA(1) to the physical programming unit PBA(0-3) in the logical address mapping table 800. Here, the data stored in the physical programming unit PBA(0-1) is marked as invalid data. Specifically, provided that all data stored in the physical programming unit of certain physical erasing unit are marked as invalid data, the memory controller 104 (or the memory management circuit 202) may perform an erasing operation on the physical erasing unit, so that the physical erasing unit which has undergone the erasing operation may be re-used for writing data. Accordingly, in order to identify the physical programming unit where the invalid data are stored, in the present exemplary embodiment, the memory controller 104 (or the memory management circuit 202) maintains the physical address information table, thereby identifying whether data stored in each physical address are valid data or invalid data. For instance, the memory controller 104 (or the memory management circuit 202) records the status of the physical address in a physical address storage status table.

FIG. 12 is a schematic diagram illustrating a physical address storage status table according to an exemplary embodiment of the present invention.

With reference to FIG. 12, the physical address storage status table 1290 includes a physical address index field 1292 and a status field 1294; the physical address index field 1292 records the reference number of each physical programming unit; the status field 1294 records the status corresponding to each physical programming unit. For instance, when the status field is marked as '0', the data stored in the corresponding physical programming unit is the invalid data; when the status field is marked as '1', the data stored in the corresponding physical programming unit is the valid data. However, the present invention is not limited thereto.

In addition to the use of the physical address storage status table 1290 to identify the status of the physical address, the physical address mapping table may also be used to identify the status of the physical address according to another exemplary embodiment of the present invention. For instance, the physical address mapping table includes a physical address index field and a logical address field, in which the logical address field is configured for recording the logical address mapped to the physical programming unit recorded in the physical address index field. By comparing the logical address mapping table and the physical address mapping table, whether the data stored in each physical programming unit are the valid data or the invalid data may then be identified.

In view of the above, during the operation of the memory storage apparatus 100, the logical address mapping tables corresponding to all logical zones may not be loaded to the buffer memory 208 at the same time. Therefore, if the host system 1000 is about to read the data stored in certain logical address, the memory controller 104 (or the memory management circuit 202) may need to load the corresponding logical address mapping table from the rewritable non-volatile memory module 106 (i.e., store the updated logical address mapping table back into the rewritable non-volatile memory module 106 and loading the logical address mapping table corresponding to the logical zone of the logical address, which is to be accessed, to the buffer memory 208). This postpones the time required for reading data and further affects access performance of the memory storage apparatus 100. Accordingly, in the present exemplary embodiment, the memory controller 104 (or the memory management circuit 202) further utilizes partial space of the buffer memory 208 for storing a continuous mapping table in process of performing a continuous writing operation, so as to record mapping relations of the continuous logical addresses and the continuous physical programming units. Here, the continuous writing operation refers to an action of writing data to be stored to the continuous logical addresses. That is, according to the present exemplary embodiment, when the host system 1000 writes a plurality of data into the continuous logical addresses, the memory controller 104 (or the memory management circuit 202) not only updates the corresponding logical address mapping table (as shown in FIG. 9) but also records a start logical address, a start physical programming unit, and a length of the correspondingly written data in the continuous mapping table, and thereby the mapping relations between the logical addresses and the physical programming units may be recorded in case of relatively insignificant amount of data. Particularly, during the data-reading operation, if the mapping information of the logical address to be accessed may be provided by the continuous mapping table, the memory controller 104 (or the memory management circuit 202) reads data from the corresponding physical programming unit according to the mapping information in the continuous mapping table, so as to reduce the number of times of loading the logical address mapping table from the rewritable non-volatile memory module 106 and expedite the data-reading operation. How the memory controller (or the memory management circuit 202) maintains the continuous mapping table to subsequently accelerate the speed of reading data is elaborated hereinafter with reference to the drawings. Note that the continuous mapping table is stored in the buffer memory 208 and is not stored in the rewritable non-volatile memory module 106 according to the present exemplary embodiment. Nevertheless, the present invention is not limited thereto; in another exemplary embodiment of the present invention, the continuous mapping table may be stored in the rewritable non-volatile memory module 106 before the memory storage apparatus 100 is powered off, and the continuous mapping table may be loaded to the buffer memory 208 for further maintenance when the memory storage apparatus 100 is restarted.

FIG. 13 is a schematic diagram illustrating an example of a continuous mapping table according to an exemplary embodiment of the present invention.

With reference to FIG. 13, the continuous mapping table 1300 includes a record reference number field 1302, a start logical address field 1304, a start physical programming unit field 1306, and a length field 1308. The record reference number field 1302 is configured for recording the reference number of a continuous mapping record, the start logical address field 1304 is configured for recording a start logical address of the continuous mapping record, the start physical programming unit field 1306 is configured for recording a start physical programming unit of the continuous mapping record, and the length field 1308 is configured for recording a length of the logical addresses in the continuous mapping record. In the present exemplary embodiment, the continuous mapping table 1300 is able to record a plurality of continuous mapping records. For instance, in an exemplary embodiment, the number of the continuous mapping records which can be recorded by the continuous mapping table 1300 may be determined according to the capacity of the buffer memory 208.

Figure 14:
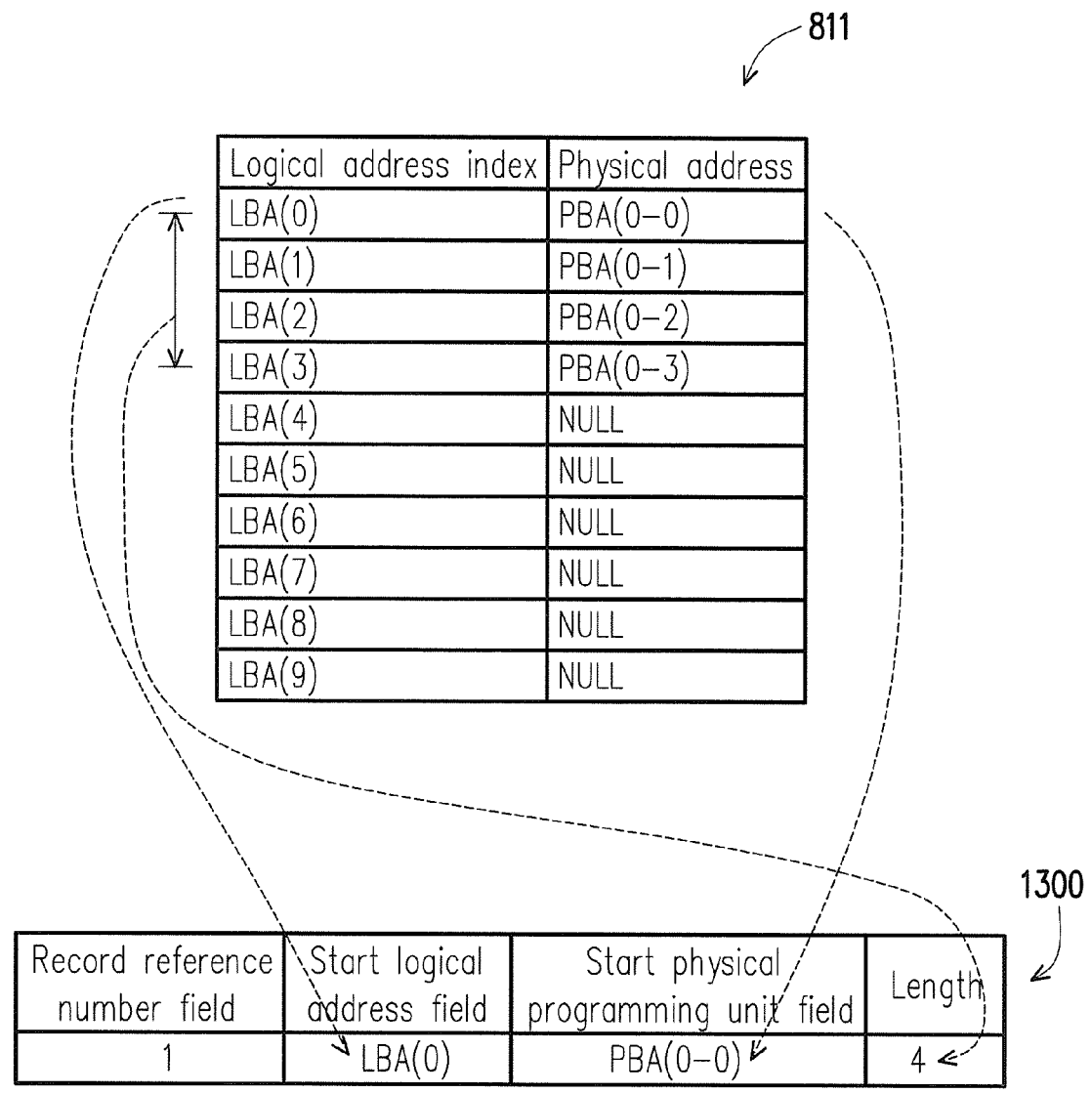
FIG. 14 illustrates an example of performing a continuous writing operation for updating a logical address mapping table and a continuous mapping table according to an exemplary embodiment of the present invention.

FIG. 14 illustrates an example of performing a continuous writing operation for updating a logical address mapping table and a continuous mapping table according to an exemplary embodiment of the present invention. For the convenience of illustration, it is assumed that the host system 1000 is about to store a plurality of data in continuous logical addresses LBA(0) to LBA(3), logical addresses LBA(0) to LBA(9) are grouped as a first logical area, and the logical address mapping table 811 is assigned to record mapping relations of the logical addresses LBA(0) to LBA(9) grouped as the first logical area.

With reference to FIG. 14, when the data to be stored in the continuous logical addresses LBA(0) to LBA(3) are received, the memory controller 104 (or the memory management circuit 202) selects a blank physical erasing unit 304(0) and writes the data to be stored in the continuous logical addresses LBA(0) to LBA(3) into continuous physical programming units PBA(0-0) to PBA(0-3) of the physical erasing unit 304 (0). Besides, the memory controller 104 (or the memory management circuit 202) loads the logical address mapping table 811 from the rewritable non-volatile memory module 106 to the buffer memory 208 and records mapping relations between the continuous logical addresses LBA(0) to LBA(3) and the continuous physical programming units PBA(0-0) to PBA(0-3) in the logical address mapping table 811. Here, the logical address LBA(0) is mapped to the physical programming unit PBA(0-0), the logical address LBA(1) is mapped to the physical programming unit PBA(0-1), the logical address LBA(2) is mapped to the physical programming unit PBA(0-2), and the logical address LBA(3) is mapped to the physical programming unit PBA(0-3).

The memory controller 104 (or the memory management circuit 202) adds another continuous mapping record ("the first continuous mapping record" hereinafter) to the continuous mapping table 1300, so as to record the start logical address LBA(0) of the continuous logical addresses LBA(0) to LBA(3), the start physical programming unit PBA(0-0) of the continuous physical programming units PBA(0-0) to PBA (0-3), and a length (i.e., 4) of the continuous logical addresses LBA(0) to LBA(3).

Figure 15:
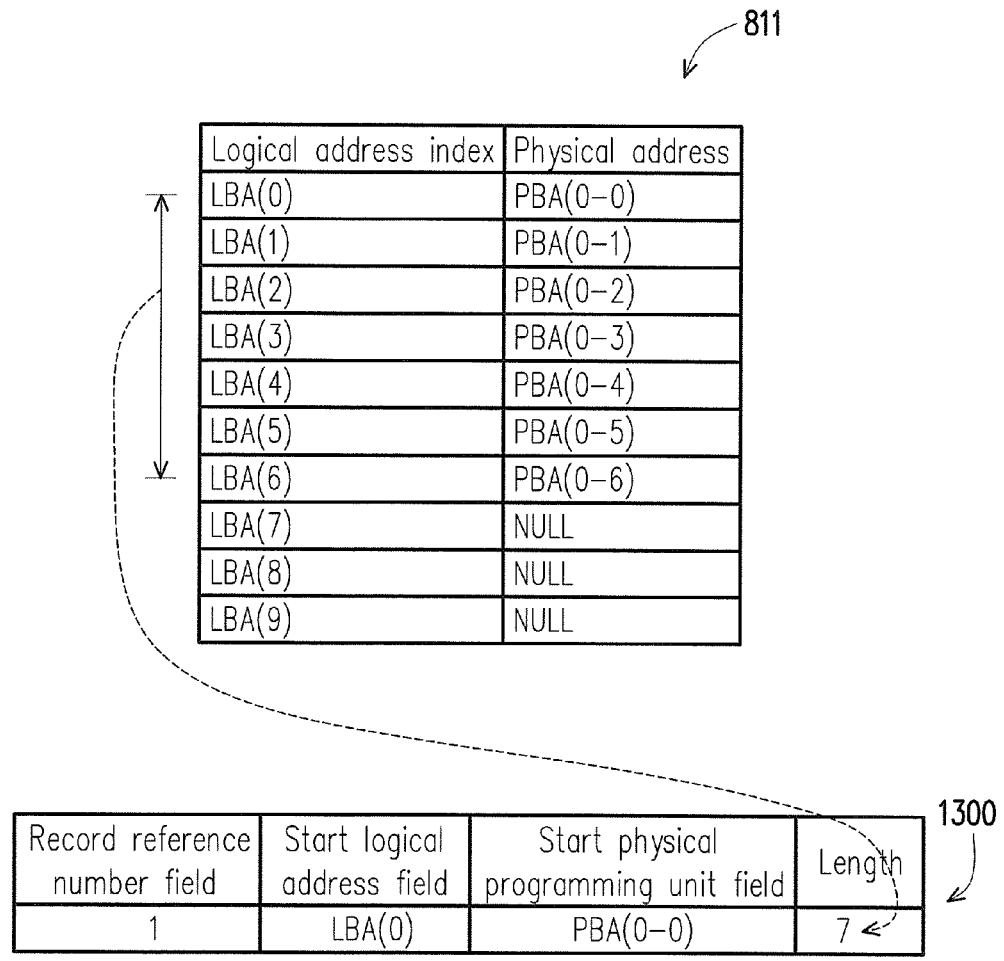
FIG. 15 illustrates another example of performing a continuous writing operation for updating a logical address mapping table and a continuous mapping table according to an exemplary embodiment of the present invention.

FIG. 15 illustrates another example of performing a continuous writing operation for updating a logical address mapping table and a continuous mapping table according to an exemplary embodiment of the present invention. The example shown in FIG. 15 follows the example shown in FIG. 14; after the host system 1000 is assumed to store a plurality of data in the continuous logical addresses LBA(0) to LBA (3), the host system 1000 is assumed to further store a plurality of data in the continuous logical addresses LBA(4) to LBA(6).

With reference to FIG. 15, when the data to be stored in the continuous logical addresses LBA(4) to LBA(6) are subsequently received, the memory controller 104 (or the memory management circuit 202) writes the data to be stored in the continuous logical addresses LBA(4) to LBA(6) into continuous physical programming units PBA(0-4) to PBA(0-6) of the physical erasing unit 304(0). Since the logical address mapping table 811 is already loaded to the buffer memory 208, the memory controller 104 (or the memory management circuit 202) may directly record mapping relations between the continuous logical addresses LBA(4) to LBA(6) and the continuous physical programming units PBA(0-4) to PBA(0-6) in the logical address mapping table 811. Here, the logical address LBA(4) is mapped to the physical programming unit PBA(0-4), the logical address LBA(5) is mapped to the physical programming unit PBA(0-5), and the logical address LBA(6) is mapped to the physical programming unit PBA(0-6).

Besides, the memory controller 104 (or the memory management circuit 202) updates the first continuous mapping record in the continuous mapping table 1300, so as to update the corresponding length to 7. In particular, the logical addresses LBA(4) to LBA(6) which store the second data follow the logical addresses LBA(0) to LBA(3), and the physical programming units PBA(0-4) to PBA(0-6) follow the physical programming units PBA(0-0) to PBA(0-3); therefore, the memory controller 104 (or the memory management circuit 202) is able to store the mapping information of the continuous logical addresses LBA(4) to LBA(6) merely by updating the values in the length field of the first continuous mapping record.

Figure 16:
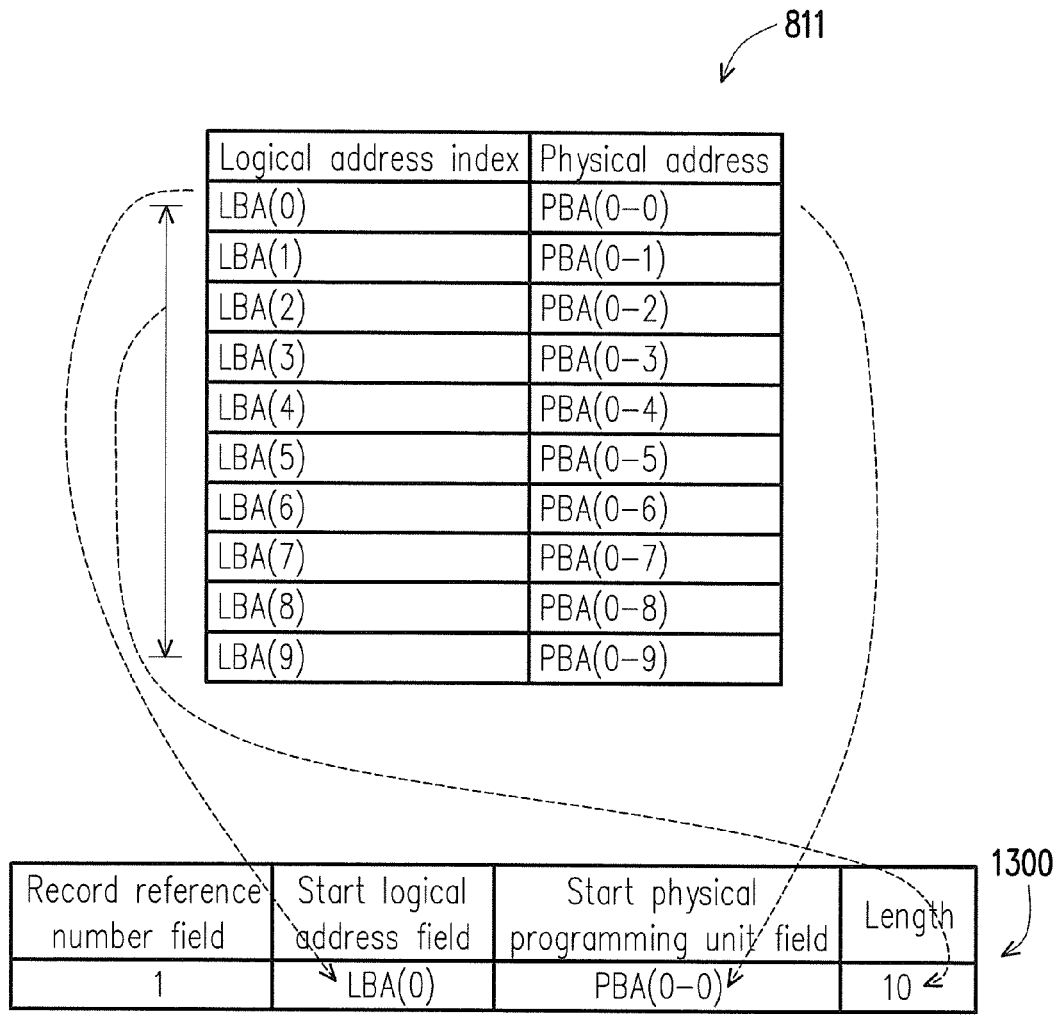
FIG. 16 and FIG. 17 illustrate another example of performing a continuous writing operation for updating a logical address mapping table and a continuous mapping table according to an exemplary embodiment of the present invention.
Figure 17:
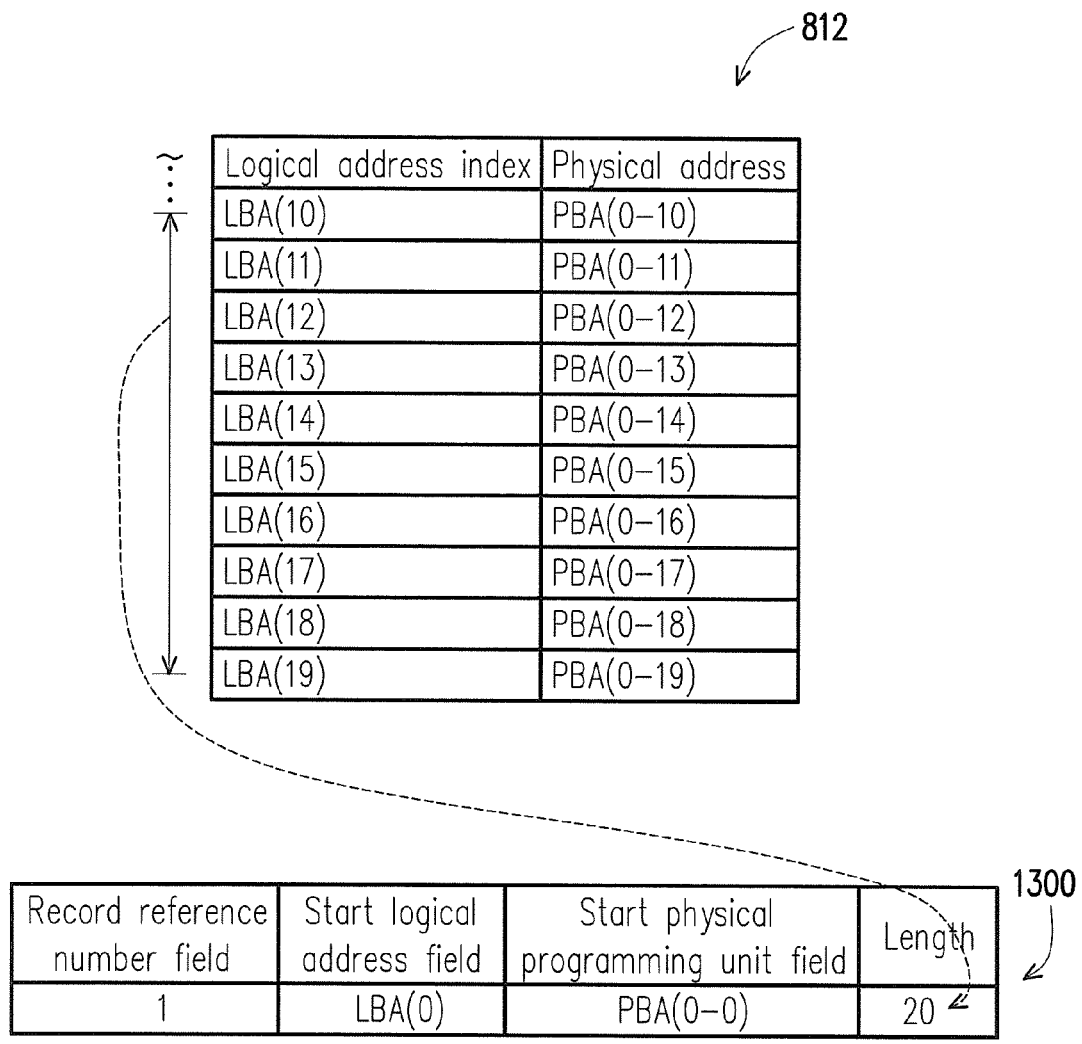

FIG. 16 and FIG. 17 illustrate another example of performing a continuous writing operation for updating a logical address mapping table and a continuous mapping table according to an exemplary embodiment of the present invention. For the convenience of illustration, it is assumed that the host system 1000 stores a plurality of data in the continuous logical addresses LBA(0) to LBA(9) and then stores a plurality of data in continuous logical addresses LBA(10) to LBA (19), the logical addresses LBA(0) to LBA(9) are grouped as the first logical area, the logical addresses LBA(10) to LBA (19) are grouped as a second logical area, the logical address mapping table 811 is assigned to record mapping relations of the logical addresses LBA(0) to LBA(9) grouped as the first logical area, and the logical address mapping table 812 is assigned to record mapping relations of the logical addresses LBA(10) to LBA(19) grouped as the second logical area.

With reference to FIG. 16, when the data to be stored in the continuous logical addresses LBA(0) to LBA(9) are received, the memory controller 104 (or the memory management circuit 202) selects a blank physical erasing unit 304(0) and writes the data to be stored in the continuous logical addresses LBA(0) to LBA(9) into continuous physical programming units PBA(0-0) to PBA(0-9) of the physical erasing unit 304 (0). Besides, the memory controller 104 (or the memory management circuit 202) loads the logical address mapping table 811 from the rewritable non-volatile memory module 106 to the buffer memory 208 and records the mapping relations between the continuous logical addresses LBA(0) to LBA(9) and the continuous physical programming units PBA (0-0) to PBA(0-9) in the logical address mapping table 811.

The memory controller 104 (or the memory management circuit 202) also adds the first continuous mapping record to the continuous mapping table 1300, so as to record the start logical address LBA(0) of the continuous logical addresses LBA(0) to LBA(9), the start physical programming unit PBA (0-0) of the continuous physical programming units PBA(0-0) to PBA(0-9), and a length (i.e., 10) of the continuous logical addresses LBA(0) to LBA(9).

With reference to FIG. 17, when the data to be stored in the continuous logical addresses LBA(10) to LBA(19) are subsequently received, the memory controller 104 (or the memory management circuit 202) writes the data to be stored in the continuous logical addresses LBA(10) to LBA(19) into continuous physical programming units PBA(0-10) to PBA (0-19) of the physical erasing unit 304(0). Specifically, the logical address mapping table 812 is not loaded to the buffer memory 208; accordingly, the memory controller 104 (or the memory management circuit 202) loads the logical address mapping table 812 from the rewritable non-volatile memory module 106 to the buffer memory 208, so as to replace the logical address mapping table 811, and the memory controller 104 (or the memory management circuit 202) records the mapping relations between the continuous logical addresses LBA(10) to LBA(19) and the continuous physical programming units PBA(0-0) to PBA(0-19) in the logical address mapping table 812.

Additionally, the memory controller 104 (or the memory management circuit 202) updates the first continuous mapping record in the continuous mapping table 1300, so as to update the corresponding length to 20. In particular, the logical addresses LBA(10) to LBA(19) follow the logical addresses LBA(0) to LBA(9), and the physical programming units PBA(0-10) to PBA(0-19) follow the physical programming units PBA(0-0) to PBA(0-9); therefore, the memory controller 104 (or the memory management circuit 202) is able to store the mapping information of the continuous logical addresses LBA(0) to LBA(19) merely by updating the length values in the first continuous mapping record.

After the data-writing operation shown in FIG. 17 is completed, given that the host system 1000 is about to read the data stored in the logical address LBA(8), and that the logical address mapping table 811 is not loaded to the buffer memory 208, the memory controller 104 (or the memory management circuit 202) is still able to obtain the mapping information of the logical address LBA(8) according to the information in the continuous mapping table 1300 to read data from the corresponding physical programming unit (i.e., the physical programming unit PBA(0-8)), so as to shorten the time required for reading data. To be specific, the memory controller 104 (or the memory management circuit 202) calculates the shift addresses between the logical address LBA(8) and the start logical address (i.e., the logical address LBA(0)) in the first continuous mapping record and then calculates the physical programming unit mapped to the logical address LBA(8) according to the shift addresses and the start physical programming unit (i.e., the physical programming unit PBA (0-0)) in the first continuous mapping record.

Figure 18:
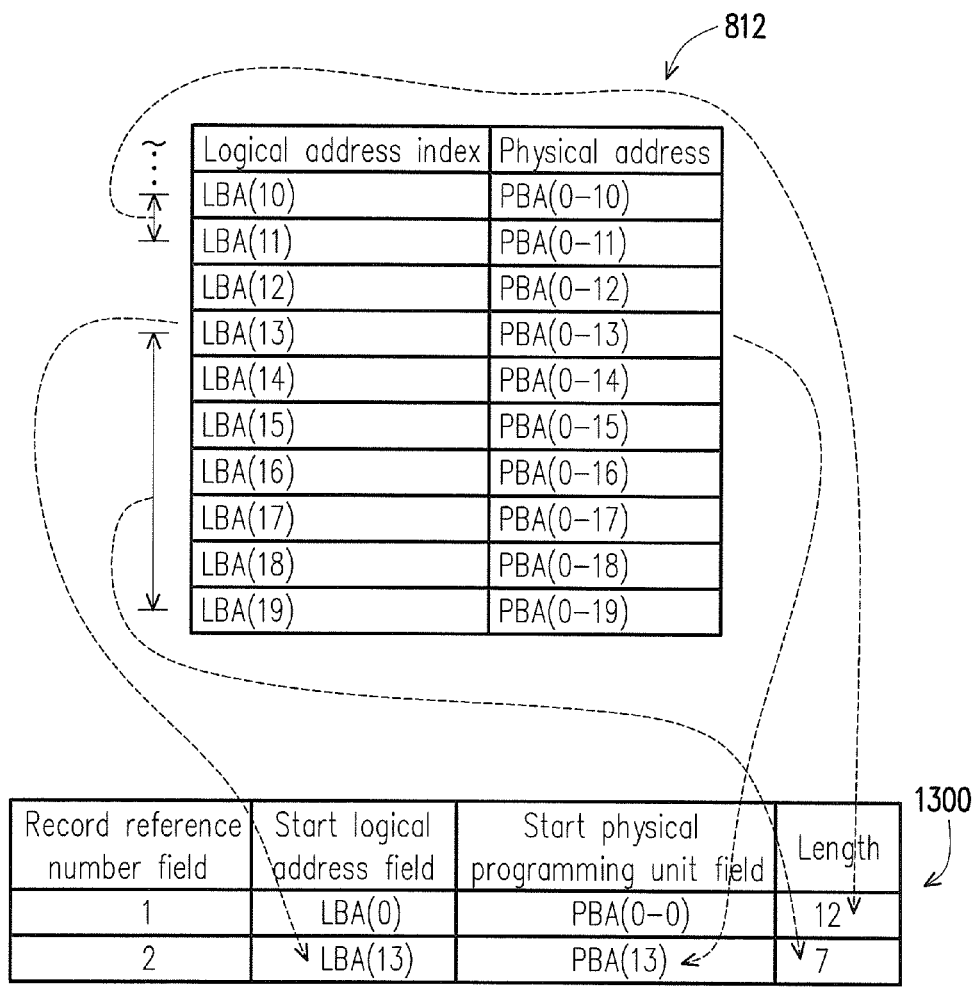
FIG. 18 illustrates another example of performing a writing operation for updating a logical address mapping table and a continuous mapping table according to an exemplary embodiment of the present invention.

FIG. 18 illustrates another example of performing a writing operation for updating a logical address mapping table and a continuous mapping table according to an exemplary embodiment of the present invention. For the convenience of illustration, the writing operation described herein is assumed to follow the writing operation shown in FIG. 16 and FIG. 17; that is, after storing a plurality of data in the continuous logical addresses LBA(0) to LBA(9) and storing a plurality of data in the continuous logical addresses LBA(10) to LBA (19), the host system 1000 updates data in the logical address LBA(12).

With reference to FIG. 18, when the updated data to be stored in the logical address LBA(12) are received, the memory controller 104 (or the memory management circuit 202) writes the updated data to be stored in the logical address LBA(12) into the continuous physical programming unit PBA(0-20) of the physical erasing unit 304(0) as well as updates the mapping relation of the logical address LBA(12) (i.e., the relation of mapping the logical address LBA(12) to the physical programming unit PBA(0-20)) in the logical address mapping table 812.

Additionally, the memory controller 104 (or the memory management circuit 202) updates the first continuous mapping record in the continuous mapping table 1300, so as to update the length field to the length (i.e., 12) of the continuous logical addresses LBA(0) to LBA(11). The memory controller 104 (or the memory management circuit 202) also adds a second continuous mapping record to the continuous mapping table 1300, so as to record the start logical address LBA(13) of the continuous logical addresses LBA(13) to LBA(19), the start physical programming unit PBA(0-13) of the continuous physical programming units PBA(0-13) to PBA(0-19), and the length (i.e., 7) of the continuous logical addresses LBA(13) to LBA(19). Specifically, the data stored in the logical address LBA(12) are updated, and the updated data are written into the physical programming unit PBA(0-20); therefore, the original continuous logical addresses LBA (0) to LBA(19) are divided into the continuous logical addresses LBA(0) to LBA(11) and the continuous logical addresses LBA(13) to LBA(19), and the memory controller 104 (or the memory management circuit 202) stores the mapping relations of the continuous logical addresses LBA(0) to LBA(11) and the continuous logical addresses LBA(13) to LBA(19) with two continuous mapping records.

It should be mentioned that the writing operation described herein is performed in one physical erasing unit by sequentially using the physical programming units; thus, said continuous physical programming units are defined to be the continuous physical programming units sequentially arranged in each physical erasing unit. However, in the writing operation described in another exemplary embodiment, the predetermined number of physical erasing units may be grouped as one, and the physical programming units of each of the physical erasing units in the group are used in turn. For instance, the writing operation may be performed according to the order of the physical programming units PBA(0-1), PBA(1-1), PBA(2-1), PBA(3-1), PBA(0-2), PBA(1-2), PBA (2-2), PBA (3-2), . . . PBA(0-k), PBA(1-k), PBA(2-k), and PBA(N-k). In this example, the continuous physical programming units are defined as physical programming units of plural physical erasing units which are sequentially employed.

Figure 19:
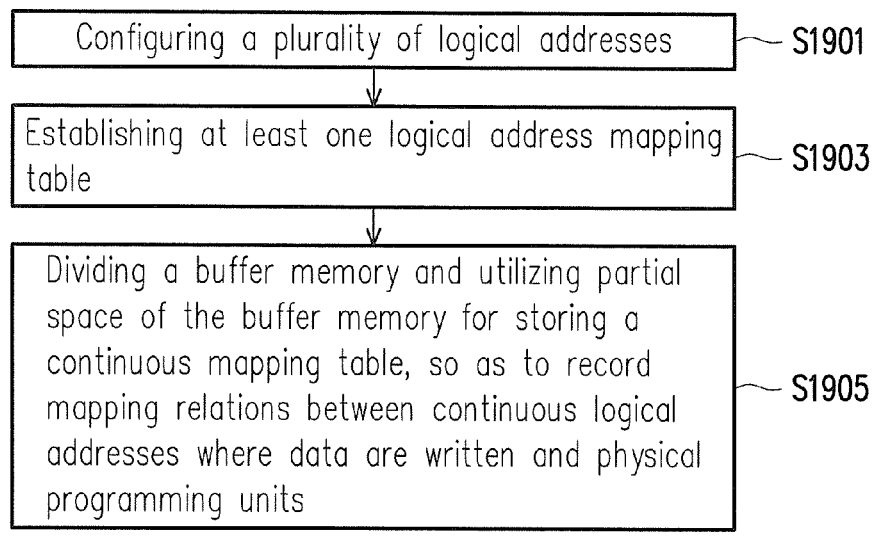
FIG. 19 is a flowchart of initializing a memory storage apparatus according to a method of recording mapping information in an exemplary embodiment of the present invention.

FIG. 19 is a flowchart of initializing a memory storage apparatus according to a method of recording mapping information in an exemplary embodiment of the present invention.

With reference to FIG. 19, in step S1901, the memory controller 104 (or the memory management circuit 202) configures a plurality of logical addresses.

In step S1903, the memory controller 104 (or the memory management circuit 202) establishes at least one logical address mapping table.

In step S1905, the memory controller 104 (or the memory management circuit 202) divides the buffer memory 208 and utilizes partial space of the buffer memory 208 for storing a continuous mapping table, so as to record the mapping relations between the continuous logical addresses where data are written and the physical programming units.

Figure 20:
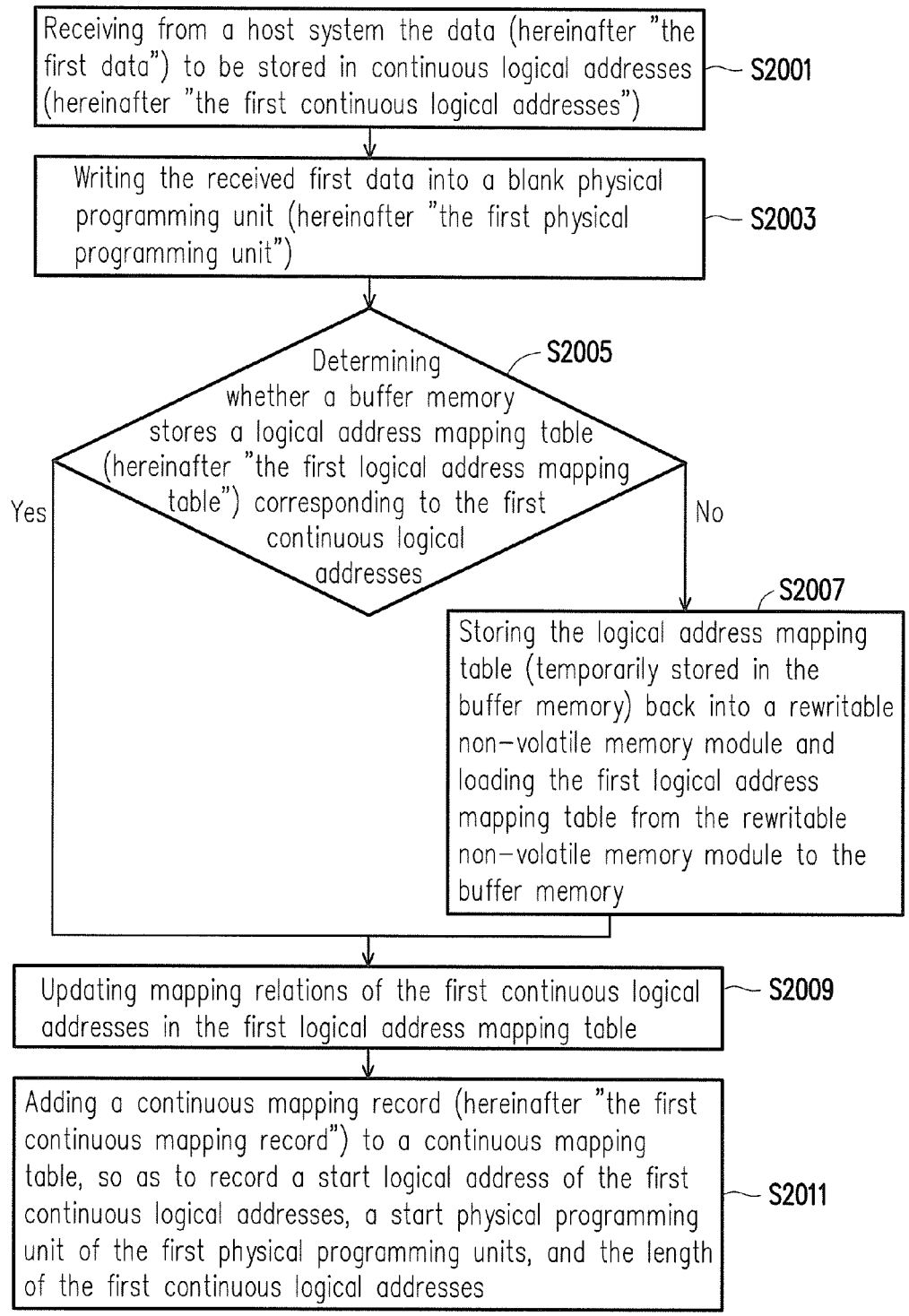
FIG. 20 is a flowchart of performing a continuous writing operation according to a method of recording mapping information in an exemplary embodiment of the present invention.

FIG. 20 is a flowchart of performing a continuous writing operation according to a method of recording mapping information in an exemplary embodiment of the present invention. Note that logical addresses where data are written according to the continuous writing operation shown in FIG. 20 do not follow a logical address indicated by the previous writing command in.

With reference to FIG. 20, in step S2001, the memory controller 104 (or the memory management circuit 202) receives from the host system 1000 the data (hereinafter "the first data") to be stored in continuous logical addresses (hereinafter "the first continuous logical addresses").

In step S2003, the memory controller 104 (or the memory management circuit 202) writes the received first data into a blank physical programming unit (hereinafter "the first physical programming unit").

In step S2005, the memory controller 104 (or the memory management circuit 202) determines whether the buffer memory 208 stores a logical address mapping table (hereinafter "the first logical address mapping table") corresponding to the first continuous logical addresses.

If the buffer memory 208 does not store the first logical address mapping table, in step S2007, the memory controller 104 (or the memory management circuit 202) stores the logical address mapping table (temporarily stored in the buffer memory 208) back into the rewritable non-volatile memory module 106 and loads the first logical address mapping table (assigned to the first logical area) from the rewritable non-volatile memory module 106 to the buffer memory 208.

In step S2009, the memory controller 104 (or the memory management circuit 202) updates the mapping relations of the first continuous logical addresses in the first logical address mapping table.

In step S2011, the memory controller 104 (or the memory management circuit 202) adds a continuous mapping record (hereinafter "the first continuous mapping record") to the continuous mapping table 1300, so as to record the start logical address of the first continuous logical addresses, the start physical programming unit of the first physical programming units, and a length of the first continuous logical addresses.

Figure 21:
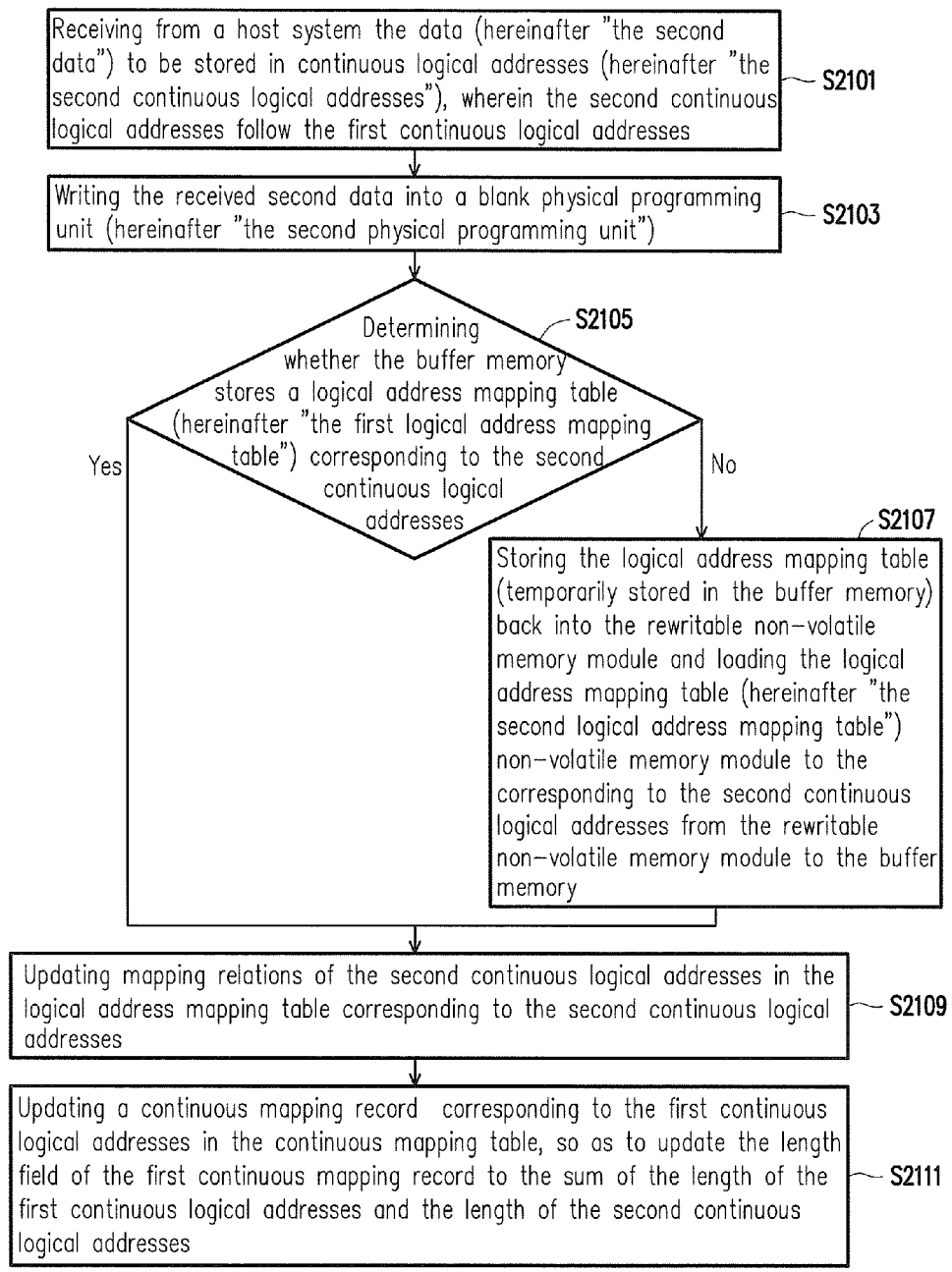
FIG. 21 is a flowchart of performing a continuous writing operation according to a method of recording mapping information in another exemplary embodiment of the present invention.

FIG. 21 is a flowchart of performing a continuous writing operation according to a method of recording mapping information in another exemplary embodiment of the present invention. Note that logical addresses where data are written according to the continuous writing operation shown in FIG. 21 follow a logical address indicated by the previous writing command in.

With reference to FIG. 21, in step S2101, the memory controller 104 (or the memory management circuit 202) receives from the host system 1000 the data (hereinafter "the second data") to be stored in continuous logical addresses (hereinafter "the second continuous logical addresses"), and the second continuous logical addresses follow the first continuous logical addresses.

In step S2103, the memory controller 104 (or the memory management circuit 202) writes the received second data into a blank physical programming unit (hereinafter "the second physical programming unit").

In step S2105, the memory controller 104 (or the memory management circuit 202) determines whether the buffer memory 208 stores a logical address mapping table corresponding to the second continuous logical addresses.

If the buffer memory 208 does not store the logical address mapping table corresponding to the second continuous logical addresses, in step S2107, the memory controller 104 (or the memory management circuit 202) stores the logical address mapping table (e.g., the first logical address mapping table) that is temporarily stored in the buffer memory 208 back into the rewritable non-volatile memory module 106 and loads the logical address mapping table (hereinafter "the second logical address mapping table") corresponding to the second continuous logical addresses from the rewritable non-volatile memory module 106 to the buffer memory 208.

In step S2109, the memory controller 104 (or the memory management circuit 202) updates the mapping relations of the second continuous logical addresses in the logical address mapping table corresponding to the second continuous logical addresses.

In step S2111, the memory controller 104 (or the memory management circuit 202) updates a continuous mapping record (i.e., the first continuous mapping record) corresponding to the first continuous logical addresses in the continuous mapping table 1300, so as to update the length field of the first continuous mapping record to the sum of the length of the first continuous logical addresses and the length of the second continuous logical addresses.

Figure 22:
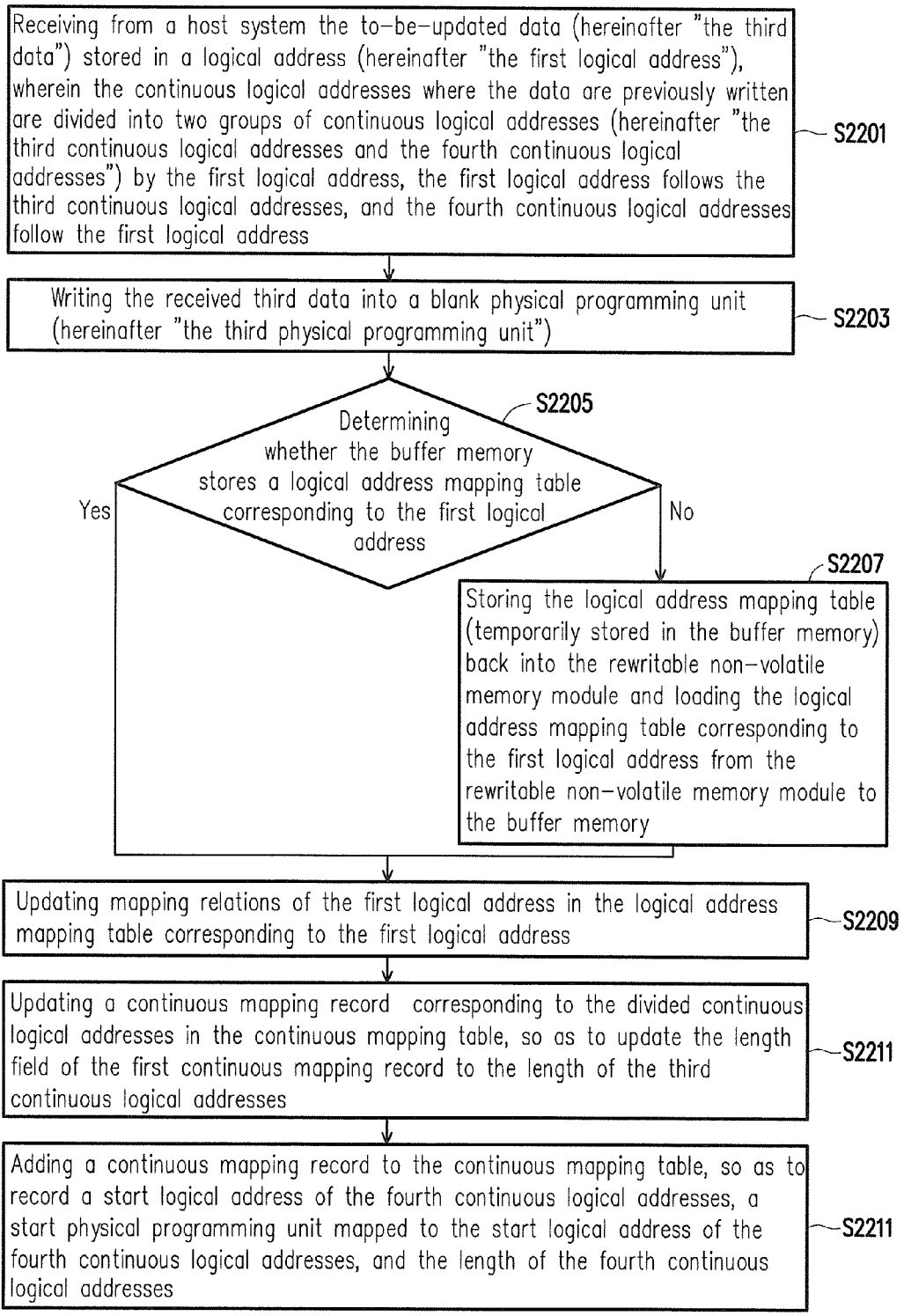
FIG. 22 is a flowchart of performing a writing operation according to a method of recording mapping information in another exemplary embodiment of the present invention.

FIG. 22 is a flowchart of performing a continuous writing operation according to a method of recording mapping information in another exemplary embodiment of the present invention. Note that the writing operation herein is performed by updating the data previously written into one of the logical addresses of the continuous logical addresses.

In step S2201, the memory controller 104 (or the memory management circuit 202) receives the to-be-updated data (hereinafter "the third data") stored in a logical address (hereinafter "the first logical address") from the host system 1000. Here, the continuous logical addresses where the data are previously written are divided into two groups of continuous logical addresses (hereinafter "the third continuous logical addresses and the fourth continuous logical addresses") by the first logical address, wherein the first logical address follows the third continuous logical addresses, and the fourth continuous logical addresses follow the first logical address.

In step S2203, the memory controller 104 (or the memory management circuit 202) writes the received third data into a blank physical programming unit (hereinafter "the third physical programming unit").

In step S2205, the memory controller 104 (or the memory management circuit 202) determines whether the buffer memory 208 stores a logical address mapping table corresponding to the first logical address.

If the buffer memory 208 does not store the logical address mapping table corresponding to the first logical addresses, in step S2207, the memory controller 104 (or the memory management circuit 202) stores the logical address mapping table (temporarily stored in the buffer memory 208) back into the rewritable non-volatile memory module 106 and loads the logical address mapping table corresponding to the first logical address from the rewritable non-volatile memory module 106 to the buffer memory 208.

In step S2209, the memory controller 104 (or the memory management circuit 202) updates the mapping relations of the first logical address in the logical address mapping table corresponding to the first logical address.

In step S2211, the memory controller 104 (or the memory management circuit 202) updates a continuous mapping record (hereinafter "the first continuous mapping record") corresponding to the divided continuous logical addresses in the continuous mapping table 1300, so as to update the length field of the first continuous mapping record to the length of the third continuous logical addresses. In step S2213, the memory controller 104 (or the memory management circuit 202) adds a continuous mapping record (hereinafter "the second continuous mapping record") to the continuous mapping table 1300, so as to record the start logical address of the fourth continuous logical addresses, the start physical programming unit mapped to the start logical address of the fourth continuous logical addresses, and the length of the fourth continuous logical addresses.

Figure 23:
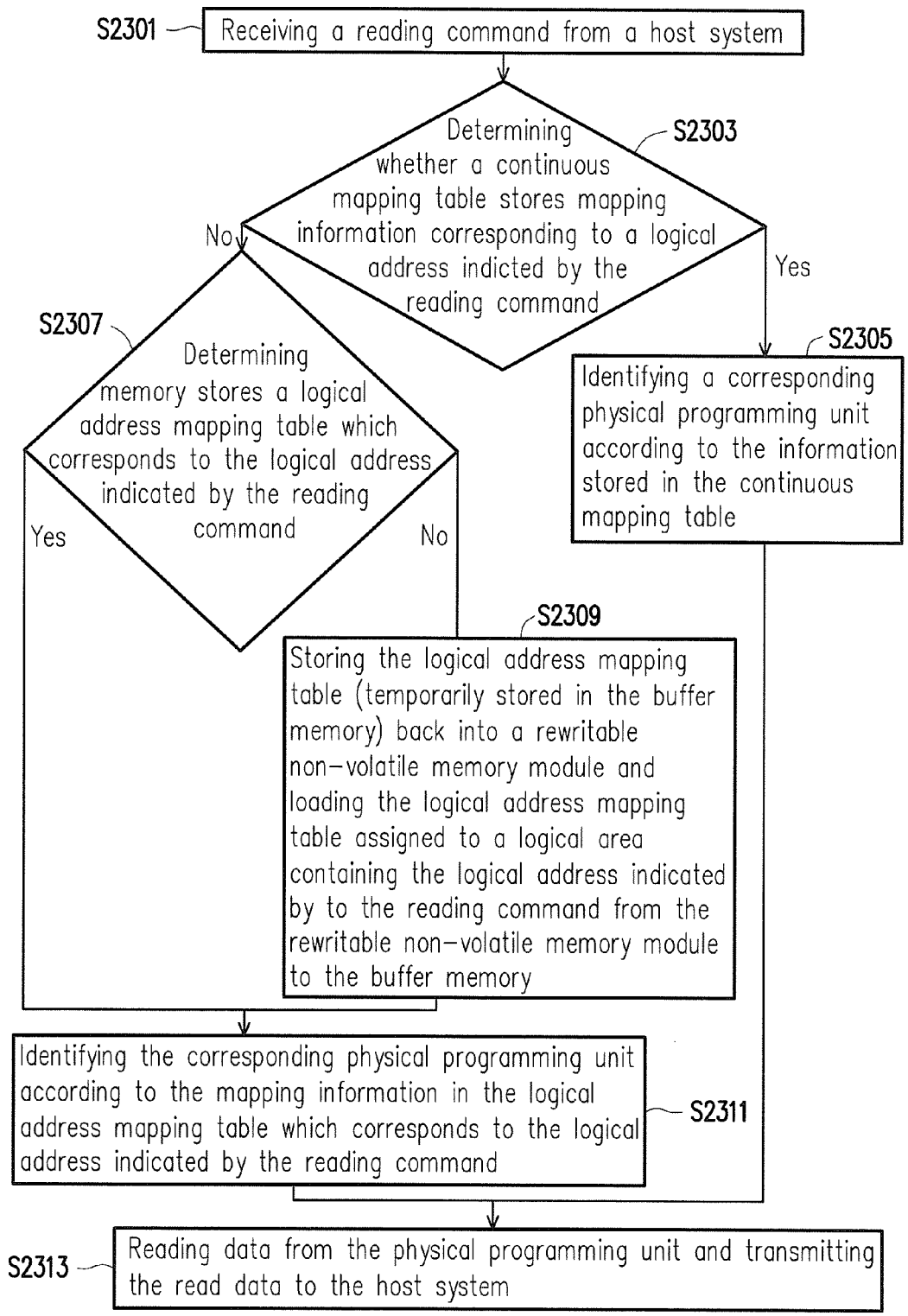
FIG. 23 is a flowchart of performing a reading operation according to a method of recording mapping information in another exemplary embodiment of the present invention.

FIG. 23 is a flowchart of performing a reading operation according to a method of recording mapping information in another exemplary embodiment of the present invention.

With reference to FIG. 23, in step S2301, the memory controller 104 (or the memory management circuit 202) receives a reading command from the host system 1000.

In step S2303, the memory controller 104 (or the memory management circuit 202) determines whether the continuous mapping table 1300 stores mapping information corresponding to a logical address indicated by the reading command.

If the continuous mapping table 1300 stores the mapping information corresponding to the logical address indicated by the reading command, in step S2305, the memory controller 104 (or the memory management circuit 202) identifies the corresponding physical programming unit according to the information stored in the continuous mapping table 1300.

If the continuous mapping table 1300 does not the mapping information corresponding to the logical address indicated by the reading command, in step S2307, the memory controller 104 (or the memory management circuit 202) determines whether the buffer memory 208 stores the logical address mapping table which corresponds to the logical address indicated by the reading command.

If the buffer memory 208 does not store the logical address mapping table which corresponds to the logical address indicated by the reading command, in step S2309, the memory controller 104 (or the memory management circuit 202) stores the logical address mapping table (temporarily stored in the buffer memory 208) back into the rewritable non-volatile memory module 106 and loads the logical address mapping table assigned to the logical area containing the logical address indicated by the reading command from the rewritable non-volatile memory module 106 to the buffer memory 208.

In step S2311, the memory controller 104 (or the memory management circuit 202) identifies the corresponding physical programming unit according to the mapping information in the logical address mapping table which corresponds to the logical address indicated by the reading command.

Moreover, in step S2313, the memory controller 104 (or the memory management circuit 202) reads data from the physical programming unit and transmits the read data to the host system 1000.

To sum up, by applying the method of recording the mapping information, the memory controller, and the memory storage apparatus described herein, the continuous mapping information may be effectively stored in the buffer memory with limited storage capacity; thereby, the required time of performing the reading operation may be reduced, and the performance of the memory storage apparatus may be ameliorated.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A method of recording mapping information for a rewritable non-volatile memory module, wherein the rewritable non-volatile memory module comprises a plurality of physical erasing units, and each of the physical erasing units comprises a plurality of physical programming units, the method comprising:
configuring a plurality of logical addresses;
establishing at least one logical address mapping table and storing the at least one logical address mapping table into the rewritable non-volatile memory module;
receiving a plurality of first data from a host system, wherein the host system requests to store the first data into a plurality of first continuous logical addresses among the logical addresses;
writing the first data into a plurality of first physical programming units among the physical programming units of the physical erasing units;
loading a first logical address mapping table corresponding to the first continuous logical addresses to a buffer memory and updating mapping relations between the first continuous logical addresses and the first physical programming units in the first logical address mapping table; and
storing a continuous mapping table in the buffer memory and recording a first continuous mapping record corresponding to the first continuous logical addresses in the continuous mapping table.

2. The method as recited in claim 1, wherein a start logical address field of the first continuous mapping record records a start logical address of the first continuous logical addresses, a start physical programming unit field of the first continuous mapping record records a start physical programming unit of the first physical programming units, and a length field of the first continuous mapping record records a length of the first continuous logical addresses.

3. The method as recited in claim 2, further comprising:
receiving third data from the host system, wherein the host system requests to store the third data into a first logical address of the first continuous logical addresses, the first logical address follows a plurality of third continuous logical addresses among the first continuous logical addresses, and a plurality of fourth continuous logical addresses among the first continuous logical addresses follow the first logical address;
writing the third data into a third physical programming unit among the physical programming units of the physical erasing units;
updating mapping relations between the first logical address and the third physical programming unit in the first logical address mapping table; and
in the continuous mapping table, updating the length field of the first continuous mapping record to a length of the third continuous logical addresses and adding a second continuous mapping record, wherein a start logical address field of the second continuous mapping record records a start logical address of the fourth continuous logical addresses, a start physical programming unit field of the second continuous mapping record records a physical programming unit mapped to a logical address following the first logical address, and a length field of the second continuous mapping record records a length of the fourth continuous logical addresses.

4. The method as recited in claim 1, further comprising:
receiving a plurality of second data from the host system, wherein the host system requests to store the second data into a plurality of second continuous logical addresses among the logical addresses, and the second continuous logical addresses follow the first continuous logical addresses;
writing the second data into a plurality of second physical programming units of the physical programming units of the physical erasing units, wherein the second physical programming units follow the first physical programming units; and
updating the first continuous mapping record in the continuous mapping table, wherein the length field of the first continuous mapping record is updated to a sum of the length of the first continuous logical addresses and a length of the second continuous logical addresses.

5. The method as recited in claim 4, further comprising:
updating mapping relations between the second continuous logical addresses and the second physical programming units in the first logical address mapping table.

6. The method as recited in claim 4, further comprising:
storing the first logical address mapping table back into the rewritable non-volatile memory module; and
loading a second logical address mapping table corresponding to the second continuous logical addresses to the buffer memory and updating mapping relations between the second continuous logical addresses and the second physical programming units in the second logical address mapping table.

7. The method as recited in claim 1, further comprising:
receiving a reading command from the host system;
determining whether the continuous mapping table stores mapping information corresponding to a logical address indicated by the reading command; and
if the continuous mapping table stores the mapping information corresponding to the logical address indicated by the reading command, reading data corresponding to the reading command from the rewritable non-volatile memory module according to the continuous mapping table.

8. The method as recited in claim 7, further comprising:
if the continuous mapping table does not store the mapping information corresponding to the logical address indicated by the reading command, loading a corresponding logical address mapping table of the logical address mapping tables from the rewritable non-volatile memory module and reading the data corresponding to the reading command from the rewritable non-volatile memory module according to the corresponding logical address mapping table, wherein the corresponding logical address mapping table corresponds to the logical address indicated by the reading command.

9. A memory controller configured to control a rewritable non-volatile memory module, wherein the rewritable non-volatile memory module comprises a plurality of physical erasing units, and each of the physical erasing units comprises a plurality of physical programming units, the memory controller comprising:
a host interface configured to couple to a host system;
a memory interface configured to couple to the rewritable non-volatile memory module;
a buffer memory; and
a memory management circuit coupled to the host interface, the memory interface, and the buffer memory,
wherein the memory management circuit is configured to configure a plurality of logical addresses,
wherein the memory management circuit is further configured to establish at least one logical address mapping table and store the at least one logical address mapping table into the rewritable non-volatile memory module,
wherein the memory management circuit is further configured to receive a plurality of first data from the host system, and the host system requests to store the first data into a plurality of first continuous logical addresses among the logical addresses,
wherein the memory management circuit is further configured to write the first data into a plurality of first physical programming units among the physical programming units of the physical erasing units,
wherein the memory management circuit is further configured to load a first logical address mapping table corresponding to the first continuous logical addresses to the buffer memory and update mapping relations between the first continuous logical addresses and the first physical programming units in the first logical address mapping table,
wherein the memory management circuit is further configured to store a continuous mapping table in the buffer memory and record a first continuous mapping record corresponding to the first continuous logical addresses in the continuous mapping table.

10. The memory controller as recited in claim 9,
wherein a start logical address field of the first continuous mapping record records a start logical address of the first continuous logical addresses, a start physical programming unit field of the first continuous mapping record records a start physical programming unit of the first physical programming units, and a length field of the first continuous mapping record records a length of the first continuous logical addresses.

11. The memory controller as recited in claim 10,
wherein the memory management circuit is further configured to receive a plurality of second data from the host system, the host system requests to store the second data into a plurality of second continuous logical addresses among the logical addresses, and the second continuous logical addresses follow the first continuous logical addresses,
wherein the memory management circuit is further configured to write the second data into a plurality of second physical programming units among the physical programming units of the physical erasing units, and the second physical programming units follow the first physical programming units,
wherein the memory management circuit is further configured to update the first continuous mapping record in the continuous mapping table, and the length field of the first continuous mapping record is updated to a sum of the length of the first continuous logical addresses and a length of the second continuous logical addresses.

12. The memory controller as recited in claim 11,
wherein the memory management circuit is further configured to update mapping relations between the second continuous logical addresses and the second physical programming units in the first logical address mapping table.

13. The memory controller as recited in claim 11,
wherein the memory management circuit is further configured to store the first logical address mapping table back into the rewritable non-volatile memory module,
wherein the memory management circuit is further configured to load a second logical address mapping table corresponding to the second continuous logical addresses to the buffer memory and update mapping relations between the second continuous logical addresses and the second physical programming units in the second logical address mapping table.

14. The memory controller as recited in claim 10,
wherein the memory management circuit is further configured to receive third data from the host system, the host system requests to store the third data into a first logical address of the first continuous logical addresses, the first logical address follows a plurality of third continuous logical addresses among the first continuous logical addresses, and a plurality of fourth continuous logical addresses among the first continuous logical addresses follow the first logical address,
wherein the memory management circuit is further configured to write the third data into a third physical programming unit among the physical programming units of the physical erasing units,
wherein the memory management circuit is further configured to update mapping relations between the first logical address and the third physical programming unit in the first logical address mapping table,
wherein the memory management circuit is further configured to update the length field of the first continuous mapping record to a length of the third continuous logical addresses in the continuous mapping table and add a second continuous mapping record to the continuous mapping table, a start logical address field of the second continuous mapping record records a start logical address of the fourth continuous logical addresses, a start physical programming unit field of the second continuous mapping record records a physical programming unit mapped to a logical address following the first logical address, and a length field of the second continuous mapping record records a length of the fourth continuous logical addresses.

15. The memory controller as recited in claim 9,
wherein the memory management circuit is further configured to receive a reading command from the host system and determine whether the continuous mapping table stores mapping information corresponding to a logical address indicated by the reading command,
wherein if the continuous mapping table stores the mapping information corresponding to a logical address indicated by the reading command, the memory management circuit is further configured to read data corresponding to the reading command from the rewritable non-volatile memory module according to the continuous mapping table.

16. The memory controller as recited in claim 15,
wherein if the continuous mapping table does not store the mapping information corresponding to a logical address indicated by the reading command, the memory management circuit is further configured to load a corresponding logical address mapping table of the logical address mapping tables from the rewritable non-volatile memory module and read the data corresponding to the reading command from the rewritable non-volatile memory module according to the corresponding logical address mapping table, and the corresponding logical address mapping table corresponds to the logical address indicated by the reading command.

17. A memory storage apparatus comprising:
a connector configured to couple to a host system;
a rewritable non-volatile memory module comprising a plurality of physical erasing units, wherein each of the physical erasing units comprises a plurality of physical programming units; and
a memory controller coupled to the connector and the rewritable non-volatile memory module, wherein the memory controller comprises a buffer memory,
wherein the memory controller is configured to configure a plurality of logical addresses,
wherein the memory controller is further configured to establish at least one logical address mapping table and store the at least one logical address mapping table into the rewritable non-volatile memory module,
wherein the memory controller is further configured to receive a plurality of first data from the host system, and the host system requests to store the first data into a plurality of first continuous logical addresses among the logical addresses,
wherein the memory controller is further configured to write the first data into a plurality of first physical programming units among the physical programming units of the physical erasing units,
wherein the memory controller is further configured to load a first logical address mapping table corresponding to the first continuous logical addresses to the buffer memory and update mapping relations between the first continuous logical addresses and the first physical programming units in the first logical address mapping table,
wherein the memory controller is further configured to store a continuous mapping table in the buffer memory and record a first continuous mapping record corresponding to the first continuous logical addresses in the continuous mapping table.

18. The memory storage apparatus as recited in claim 17,
wherein a start logical address field of the first continuous mapping record records a start logical address of the first continuous logical addresses, a start physical programming unit field of the first continuous mapping record records a start physical programming unit of the first physical programming units, and a length field of the first continuous mapping record records a length of the first continuous logical addresses.

19. The memory storage apparatus as recited in claim 18,
wherein the memory controller is further configured to receive a plurality of second data from the host system, the host system requests to store the second data into a plurality of second continuous logical addresses among the logical addresses, and the second continuous logical addresses follow the first continuous logical addresses,
wherein the memory controller is further configured to write the second data into a plurality of second physical programming units among the physical programming units of the physical erasing units, and the second physical programming units follow the first physical programming units,
wherein the memory controller is further configured to update the first continuous mapping record in the continuous mapping table, and the length field of the first continuous mapping record is updated to a sum of the length of the first continuous logical addresses and a length of the second continuous logical addresses.

20. The memory storage apparatus as recited in claim 19,
wherein the memory controller is further configured to update mapping relations between the second continuous logical addresses and the second physical programming units in the first logical address mapping table.

21. The memory storage apparatus as recited in claim 19,
wherein the memory controller is further configured to store the first logical address mapping table back into the rewritable non-volatile memory module,
wherein the memory controller is further configured to load a second logical address mapping table corresponding to the second continuous logical addresses to the buffer memory and update mapping relations between the second continuous logical addresses and the second physical programming units in the second logical address mapping table.

22. The memory storage apparatus as recited in claim 18,
wherein the memory controller is further configured to receive third data from the host system, the host system requests to store the third data into a first logical address of the first continuous logical addresses, the first logical address follows a plurality of third continuous logical addresses among the first continuous logical addresses, and a plurality of fourth continuous logical addresses among the first continuous logical addresses follow the first logical address,
wherein the memory controller is further configured to write the third data into a third physical programming unit of the physical programming units among the physical erasing units,
wherein the memory controller is further configured to update mapping relations between the first logical address and the third physical programming unit in the first logical address mapping table,
wherein the memory controller is further configured to update the length field of the first continuous mapping record to a length of the third continuous logical addresses in the continuous mapping table and add a second continuous mapping record to the continuous mapping table, a start logical address field of the second continuous mapping record records a start logical address of the fourth continuous logical addresses, a start physical programming unit field of the second continuous mapping record records a physical programming unit mapped to a logical address following the first logical address, and a length field of the second continuous mapping record records a length of the fourth continuous logical addresses.

23. The memory storage apparatus as recited in claim 17, wherein the memory controller is further configured to receive a reading command from the host system and determine whether the continuous mapping table stores mapping information corresponding to a logical address indicated by the reading command, wherein if the continuous mapping table stores the mapping information corresponding to a logical address indicated by the reading command, the memory controller is further configured to read data corresponding to the reading command from the rewritable non-volatile memory module according to the continuous mapping table.

24. The memory storage apparatus as recited in claim 23, wherein if the continuous mapping table does not store the mapping information corresponding to a logical address indicated by the reading command, the memory controller is further configured to load a corresponding logical address mapping table of the logical address mapping tables from the rewritable non-volatile memory module and read the data corresponding to the reading command from the rewritable non-volatile memory module according to the corresponding logical address mapping table, and the corresponding logical address mapping table corresponds to the logical address indicated by the reading command.

* * * * *